(12) United States Patent
Pittman et al.

(10) Patent No.: US 11,250,698 B2
(45) Date of Patent: Feb. 15, 2022

(54) DATA PROCESSING FOR CONNECTED AND AUTONOMOUS VEHICLES

(71) Applicant: Blyncsy, Inc., Salt Lake City, UT (US)

(72) Inventors: Mark E. Pittman, Salt Lake City, UT (US); Patrick B. Brown, Salt Lake City, UT (US); David J. Sacharny, Salt Lake City, UT (US); Victor Gill, Salt Lake City, UT (US)

(73) Assignee: Blyncsy, Inc., Salt Lake City, UT (US)

( * ) Notice: Subject to any disclaimer, the term of this patent is extended or adjusted under 35 U.S.C. 154(b) by 0 days.

(21) Appl. No.: 16/848,452

(22) Filed: Apr. 14, 2020

(65) Prior Publication Data

US 2020/0334978 A1 Oct. 22, 2020

Related U.S. Application Data

(60) Provisional application No. 62/835,373, filed on Apr. 17, 2019.

(51) Int. Cl.
*G08G 1/01* (2006.01)
*G08G 1/087* (2006.01)
*H04L 29/08* (2006.01)
*H04W 4/44* (2018.01)
*H04L 12/911* (2013.01)
*H04W 4/80* (2018.01)

(52) U.S. Cl.
CPC ......... *G08G 1/0145* (2013.01); *G08G 1/0116* (2013.01); *G08G 1/087* (2013.01); *H04L 47/821* (2013.01); *H04L 67/12* (2013.01); *H04W 4/44* (2018.02); *H04W 4/80* (2018.02)

(58) Field of Classification Search
CPC ........ G08G 1/0145; G08G 1/087; G08G 1/07; G08G 1/096741; G08G 1/095; H04W 4/46; H04W 72/1242; G01C 21/3415
See application file for complete search history.

(56) References Cited

U.S. PATENT DOCUMENTS

| | | | |
|---|---|---|---|
| 2013/0191132 A1* | 7/2013 | Tanaka | G01C 21/3608 704/275 |
| 2019/0265059 A1* | 8/2019 | Warnick | G05D 1/0291 |
| 2019/0287396 A1* | 9/2019 | Sayin | G08G 1/0116 |
| 2019/0293442 A1* | 9/2019 | Niewiadomski | G08G 1/0133 |
| 2019/0387558 A1* | 12/2019 | Cao | H04W 72/1242 |

* cited by examiner

*Primary Examiner* — Mirza F Alam
(74) *Attorney, Agent, or Firm* — Maschoff Brennan

(57) ABSTRACT

A method may be implemented to prioritize and analyze data exchanged in a connected vehicle transit network. The method may include receiving, at a roadside unit, vehicle data from a connected vehicle. The method may further include prioritizing the vehicle data received from the connected vehicle based on of urgency, network latency or available computing resources.

18 Claims, 11 Drawing Sheets

400

402 — $dateRange \leftarrow$ three months
404 — $distance \leftarrow endSensor - startSensor$
406 — $windowDuration \leftarrow 60$ minutes
408 — $slideDuration \leftarrow 5$ minutes
410 — for each $windowDuration$ in $dateRange$ every
         $slideDuration$ do
412 —    $count \leftarrow$ number of matches
414 —    $meanTravelTime \leftarrow mean(travelTimes)$
416 —    $speed \leftarrow mean(\frac{distance}{meanTravelTime})$
418 —    $flow \leftarrow count * \frac{windowDuration}{60}$
420 —    $occupancy \leftarrow \frac{flow}{speed}$
         end for
422 — $model \leftarrow cluster(speed, flow, occupancy, k = 2)$

Figure 7

DATA PROCESSING FOR CONNECTED AND AUTONOMOUS VEHICLES

CROSS-REFERENCE TO RELATED APPLICATIONS

This application claims priority to and the benefit of U.S. Provisional Patent Application No. 62/835,373, filed Apr. 17, 2019, titled DATA PROCESSING FOR CONNECTED AND AUTONOMOUS VEHICLES, which is incorporated herein by reference in its entirety.

This patent application cross-references U.S. Non-Provisional application Ser. No. 15/910,782 filed Mar. 2, 2018; U.S. Non-Provisional application Ser. No. 14/947,352 filed Nov. 20, 2015; U.S. Provisional Application No. 62/197,464 filed Jul. 27, 2015; U.S. Provisional Application No. 62/197,462 filed Jul. 27, 2015; U.S. Provisional Application No. 62/127,638 filed Mar. 3, 2015; U.S. Provisional Application No. 62/466,242 filed Mar. 2, 2015; U.S. Provisional Application No. 62/345,598 filed Jun. 3, 2016; and U.S. Provisional Application No. 62/082,212 filed Nov. 20, 2014 which are incorporated herein by specific reference in their entirety.

BACKGROUND

The present disclosure generally relates to connected vehicle technology. However, the claimed subject matter is not limited to embodiments that solve any disadvantages or that operate only in environments such as those described herein. This description is only provided to illustrate examples of where the present disclosure may be utilized.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

In an example, a method to prioritize and analyze data exchanged in a connected vehicle transit network may include receiving, at a roadside unit, vehicle data from a connected vehicle; and prioritizing the vehicle data received from the connected vehicle based on a level of urgency, network latency or available computing resources. The prioritizing may include determining a level of urgency based on whether or not the vehicle data indicates an event critical to safety.

The method may include transmitting a message to other vehicles in the area of the connected vehicle in response to determining that the vehicle data indicates the event is critical to safety. The method may include transmitting a message to a localized server or a remote server in response to determining that the vehicle data indicates the event is not critical to safety. Prioritizing may include determining whether the vehicle data should be processed at the roadside unit, a localized server, or a remote server based on the level of urgency, the network latency or the available computing resource.

The method may include transmitting the vehicle data from the roadside unit to a server, and collecting, aggregating, and processing the vehicle data received from the roadside unit at the server. The method may include adapting intersections to manage traffic in real-time based on the vehicle data received from the connected vehicle. The method may include receiving signal phase and timing data, at the connected vehicle, from the roadside unit, and changing the behavior of the connected vehicle based on the signal phase and timing data received from the roadside unit. The method may include changing signal phase and timing of at least one of the intersections. The vehicle data may be exchanged between the connected vehicle and the roadside unit using dedicated short-range communication (DSRC), and the vehicle data comprises: speed, acceleration, engine performance, trajectory, intended destination, an indicator of an accident, or a combination thereof.

In another example, a method of actuating a traffic signal to improve traffic flow may include receiving a signal preemption request at roadside unit from a connected vehicle, determining a priority of the signal preemption request, wherein the priority of the signal preemption request is determined based on a level of urgency associated with the signal preemption request, and determining whether to actuate the traffic signal immediately or after a specified amount of time has passed based on the priority of the signal preemption request The priority of the signal preemption request may be determined based on the type of connected vehicle associated with the signal preemption request. The priority of the signal preemption request may be determined to be high based on the connected vehicle being an emergency vehicle. The traffic signal may be actuated immediately in response to the determination that the priority of the signal preemption request is high. The priority of the signal preemption request may be determined to be low based on the connected vehicle being a mass transit vehicle. The traffic signal may be actuated after the specified amount of time has passed in response to the determination that the priority of the signal preemption request is low.

The connected vehicle may be a snow plow, and the actuation of the traffic signal may depend on whether there is snow accumulation on a roadway associated with the snow plow. The connected vehicle may be a mass transit vehicle, and the actuation of the traffic signal may depend on a level of capacity of the mass transit vehicle or level that a mass transit vehicle is behind schedule. The traffic signal may be actuated in response to low cross-traffic volume associated with the connected vehicle. The actuation of the traffic signal may depend on whether the current time is within a peak traffic time range. The signal preemption request may be exchanged between the connected vehicle and the roadside unit using dedicated short-range communication (DSRC).

BRIEF DESCRIPTION OF THE DRAWINGS

FIG. 7 illustrates a method for building a segment traffic model by clustering estimates of speed, occupancy, and flow.

DETAILED DESCRIPTION

Figure 1:
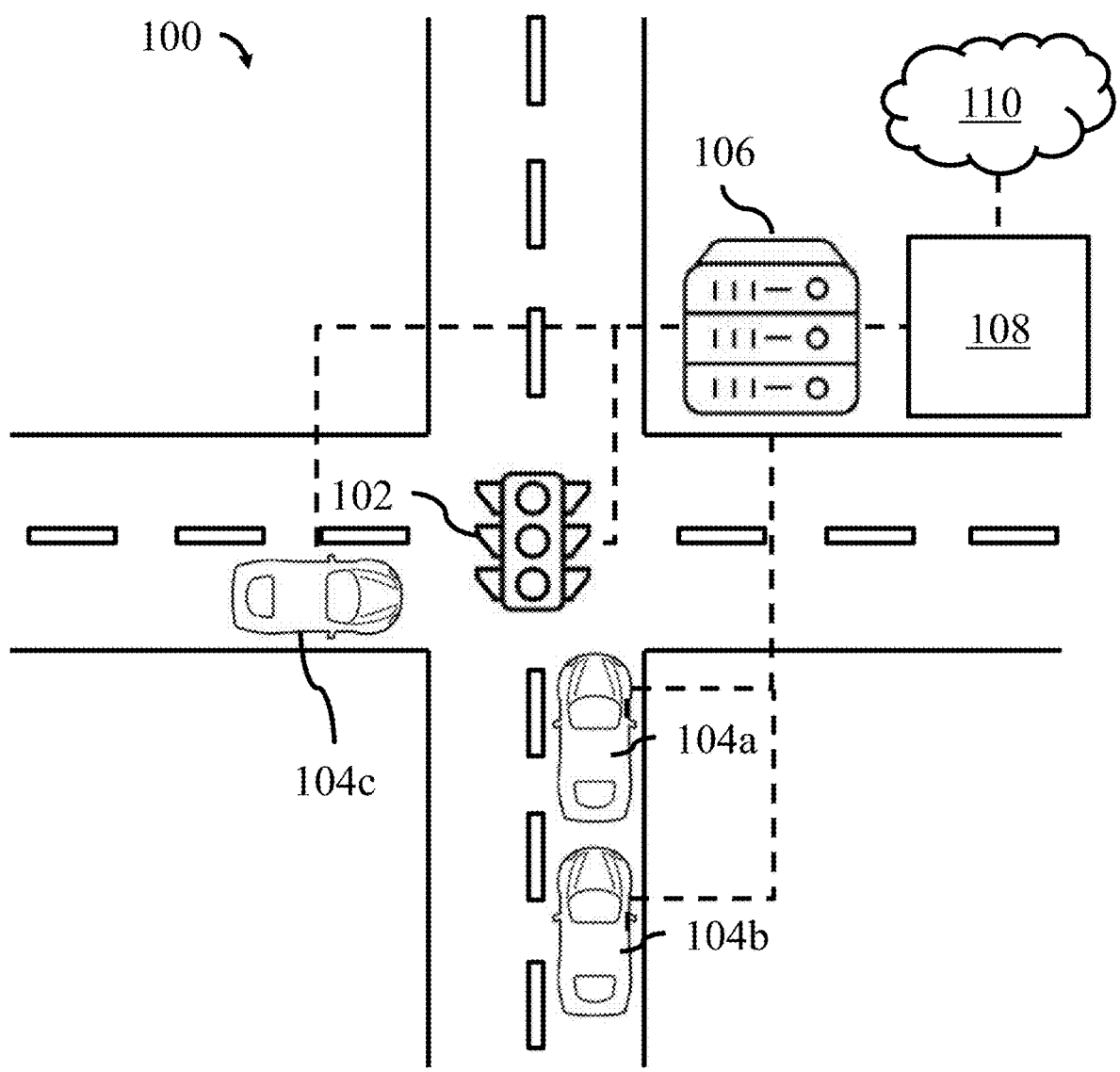
FIG. 1 is a schematic representation of an example intersection.

Connected vehicle technologies allow vehicles to communicate with each other and the world around them. Many vehicles on the road today are connected vehicles. For example, many vehicles include navigation systems or subscription-based emergency services such as OnStar. Navigation systems include connected vehicle functionality, such as dynamic route guidance. Global Positioning Systems (GPS) systems may receive information on road congestion through cellular signals (e.g., 3G or 4G LTE) and suggest an alternative route. Vehicle emergency service systems send and receive signals when a driver requests help or is involved in an accident.

Connected vehicles may be used to supply useful information to a driver or a vehicle to help the driver make safer or more informed decisions. Generally, connected vehicles do not make any choices for the driver. Rather, connected vehicles supply information to the driver, including potentially dangerous situations to avoid.

The United States Department of Transportation (USDOT) has been working on a connected vehicle program that communicates within a radio spectrum specifically allocated by the Federal Communications Commission. In the future, the United States National Highway Transportation Safety Administration may mandate inclusion of connected vehicle equipment in all new vehicles because this technology has the potential to eliminate many unimpaired crash scenarios and could save tens of thousands of lives each year.

Connected vehicle technology may enable transportation agencies to access vehicle data without compromising personal information. For example, transportation agencies may access data related to speed, location and trajectory of a vehicle. Accordingly, connected vehicles may send information to transportation agencies to enhance their knowledge of real-time road conditions, as well as generate historic data. Such data may be used to help agencies better plan and allocate resources, and improve traffic flow.

Another technology being implemented in vehicles is autonomous vehicle technology. Connected vehicles are not necessarily autonomous vehicles, and vice versa. Generally, there are different levels of automation for autonomous vehicles, ranging from driver assistance systems such as adaptive cruise control (level 1), to automated driving systems that undertake all aspects of driving tasks in all roadway and environmental conditions (level 5). Many vehicles are already being deployed with autonomous driver assistance functionality, such as self-parking or auto-collision avoidance features. There are currently no fully autonomous vehicles in production, but vehicles will become increasingly automated as autonomous vehicle technology is further developed and becomes more publically acceptable.

Autonomous vehicles do not necessarily need connected vehicle technology to function since they are generally expected to operate independently. However, connected vehicle technologies may provide valuable information about the road ahead, allowing rerouting based on new information such as lane closures or obstacles on the road. By incorporating connected vehicle technology, autonomous vehicles may be safer, faster, and more efficient. Accordingly, autonomous vehicles will likely include some type of real-time exchange of information that connected vehicle technology may provide.

In addition to being connected and somewhat autonomous, many new vehicles are at least partially electrically powered. Generally, there has been a trend of increased production and use of electric vehicles to address environmental concerns. Electric vehicles may be fully powered by electricity, or they may include hybrid drivetrains that also powered by a conventional fuel such as gasoline. Another trend in automotive technology is the trend of alternative vehicle ownership models, such as distributed ownership.

Furthermore, distributed ownership models for vehicles are expected to increase as well. In distributed ownership, many different drivers share ownership and use of multiple different vehicles. Distributed ownership models have both environmental advantages, and advantages to drivers, including cost savings, maintenance savings, and convenience.

As used herein, connected vehicles (CVs) are vehicles that include systems that send or receive real-time information. Autonomous vehicles (AVs) are vehicles that include systems for at least some level of automation (e.g., between level 1 and level 5). Connected and Autonomous Vehicles (CAVs) are vehicles that include connected vehicle and autonomous vehicle functionality. Connected autonomous distributed electric (CADE) vehicles include connected vehicle and autonomous vehicle functionality, may be subject to a distributed ownership model, and may be at least partially electric.

The benefits of CVs and CAVs are numerous, including improvements to safety, congestion, vehicle emission, time savings and road design. Currently many accidents involve driver error. CAVs may be better suited to reliably perform the repetitive tasks associated with driving, without experiencing fatigue, to reduce the opportunity for driver error, and significantly reduce the number of crashes. CAV technology may also permit vehicles to drive closer to one another, which may increase roadway capacity without decreasing safety. In addition, CAV technology may be used to optimize traffic, which may lead to decreased vehicle emissions. CAV technology may improve roadways by eliminating the need for crash barriers and roadway signs. In addition, lane sizes could be reduced while allowing greater traffic density.

Some connected vehicle systems may deploy roadside equipment to communicate with CVs. Such roadside equipment may use any suitable communication protocol to exchange data with vehicles. One example is dedicated short-range communication (DSRC), which is a wireless communication technology designed to allow automobiles in connected vehicle systems to communicate with other automobiles or roadside equipment. DSRC operates on a band of the radio frequency spectrum which makes it particularly effective for short to medium distances. Generally, DSRC has low latency and high reliability, is secure, and supports interoperability. In addition, DSRC receives very little interference, even in poor weather conditions, because of its short range spans. This makes it a suitable protocol for communication to and from fast-moving vehicles.

DSRC technology can be used in either a vehicle-to-vehicle (V2V) or vehicle-to-infrastructure (V2I) format. In some circumstances, DSRC systems may communicate using transponders known as on-board units (OBUs) or roadside units (RSUs). In V2V, DSRC may be used to allow vehicles to communicate with each other through OBUs. This communication may be for safety reasons, such as to alert the driver of one car that the car in front of it is about to slow down. In V2I, an OBU in or on the vehicle may communicate with surrounding infrastructure equipped with an RSU. This may alert the driver to safety risks, such as approaching a curve too quickly, or can be used to collect tolls and parking payments.

Although systems implementing DSRC signals have certain advantages, connected vehicle systems may use any suitable communication protocol to communicate with vehicles, such as WiFi, Bluetooth, cellular, or a combination thereof. Some connected vehicle systems my implement wired or wireless communication protocols in addition to or as an alternative to DSRC signals.

Reference will now be made to the drawings and specific language will be used to describe various aspects of the disclosure. Using the drawings and description in this manner should not be construed as limiting its scope. The drawings are non-limiting, diagrammatic, and schematic representations of example embodiments, and are not necessarily drawn to scale. Additional aspects may be apparent in light of the disclosure, including the claims, or may be learned by practice.

Connected Intersection

FIG. 1 is a schematic representation of an example intersection 100. As illustrated, the intersection 100 may include a traffic signal 102, which directs traffic traveling through the intersection 100, such as vehicles 104a, 104b, and 104c. If the intersection 100 is part of a connected vehicle system, it may include a communication module such as an RSU 106. The RSU 106 may be communicatively coupled to the traffic signal 102. The RSU 106 and the traffic signal 102 may send and receive signals between one another. In some circumstances, the RSU 106 may control the traffic signal 102. In such configurations, the RSU 106 may manage traffic through the intersection 100 using the traffic signal 102. Each of the vehicles 104a-c may include an OBU. The RSU 106 may be communicatively coupled to vehicles or other connected devices travelling through the intersection, such as the vehicles 104a-c, via the OBUs. Additionally or alternatively, the vehicles 104a-c may be connected to one another.

The RSU 106 may be communicatively coupled to a computer network 110 via a server 108 or other suitable communication module. The computer network 110 may be a private network or a public network such as the internet. In some circumstances, the RSU 106 may be communicatively coupled to the server 108 via a physical link such as an optical fiber or electrical cable. In other configurations, the RSU 106 may be wireless coupled to the server 108, although any suitable configuration may be implemented.

In the illustrated configuration, the RSU 106 is coupled to a traffic signal. However, roadway infrastructure may include RSUs in other places besides intersections, and therefore RSUs may not be coupled to traffic signals. For example, RSUs may be positioned to monitor traffic conditions along straight-line or curved sections of roadways, near school zones, constructions zones, or other suitable applications. RSUs may correspond to lamp posts, road signs, bridges, or other roadway features.

Many different types of data may be exchanged between different components in connected vehicle systems. One type of data is signal phase and timing (SPaT) data. SPaT data may include the current state of the traffic signal, for example, the current color(s) displayed by the traffic signal for certain directions of vehicle travel. SPaT data may include future states of the traffic signal, for example, when the traffic signal will change colors. SPaT data may be transmitted to the vehicles 104a-c, for example, to a computer system coupled to one of the vehicles 104a-c, or to a mobile device positioned in one of the vehicles 104a-c (e.g., a driver's mobile phone or the like). SPaT data may be transmitted from a variety of RSUs, such as the RSU 106, positioned at different intersections. In some circumstances, the vehicles 104a-c may receive SPaT data from various RSUs, and this information may be used to change driving behavior.

SPaT data may be used for safety applications such as warnings and alerts for crash avoidance. SPaT data may also be used for mobility applications to enable dynamic and efficient traffic management, either individually for each vehicle, or to control traffic patterns of multiple vehicles. In addition, SPaT data may be used for environment applications to time a vehicles approach a traffic light(s) to allow savings in fuel consumption and reduction in vehicle emissions. In some circumstances, SPaT data may be accompanied by other information, such as map data that conveys the geometric layout of an intersection, and/or positioning data that allows the correlation of the signal and map data.

SPaT data may be used to change the behavior of drivers of the vehicles 104a-c. For example, if a vehicle is waiting at an intersection at a red light, and the driver may receive SPaT data indicating that the light will turn green shortly (e.g., ten seconds) via display in the vehicle or on their mobile device. The driver may use this information and put their vehicle in gear in anticipation of the light turning green. In another example, the SPaT data may be used to automatically or manually turn the engine on and off during the time the vehicle is expected to be waiting at the intersection. In yet another example, a driver may approach an intersection displaying a red light, but the driver may receive SPaT data indicating that the light will turn green shortly (e.g., ten seconds). In such circumstances, the driver may coast the vehicle knowing that the light will change to green shortly, thereby saving time, expending less energy, and emitting less vehicle emissions. SPaT data may be applied in many different circumstances, whether the driver is a human or autonomous. However, is some circumstances autonomous vehicles may more effectively process large amounts of SPaT data to further increase vehicle efficiency on connected roadways.

Besides SPaT data, connected vehicles may send other signals and data. For example, the vehicles 104a-c may monitor various vehicle metrics such as speed, acceleration, engine performance, trajectory, intended destination, etc. In another example, the vehicles 104a-c may monitor indicators of an accident or other incident, and to send data indicative of the accident and including relevant information if one occurs. In particular, one of the vehicles 104a-c may be configured to send a signal when an airbag is deployed, the vehicle experiences a sudden unexpected deceleration, a crash sensor is triggered, or other accident indicator is triggered. In some circumstances, connected vehicle data may not include a unique identifier or may be anonymized, to protect the privacy of the driver of the vehicle.

Data from a connected vehicle can be transmitted to a nearby vehicle or RSU, such as the RSU 106. In circumstances where the data is transmitted to the RSU 106, it may then be transmitted remotely via the computer network 110, for example, to a transit authority or emergency services provider. Nearby vehicles may be alerted to expect an accident and adjust their speed accordingly. Additionally or alternatively, a local transit authority and/or emergency service provider may receive information relevant to the accident in order to respond accordingly.

Transit networks with large quantities of connected vehicles may handle large amounts of data as vehicles and RSUs exchange information. One connected vehicle may exchange an estimated 25 gigabytes (GB) of data per hour, and an estimated 600 GB per day. If hundreds of vehicles travel through an intersection per hour, just one RSU in an intersection may receive hundreds of gigabytes of data per hour. The methods and systems described herein may facilitate processing the large amounts of data exchanged in a connected vehicle transit network. Additionally or alternatively, methods and systems described may prioritize and effectively analyze the connected vehicle data. Specifically, the methods and systems described may prioritize and/or decide which computing or storage resources are used for various data in the connected vehicle transit network.

Connected Transit Network

Figure 2:
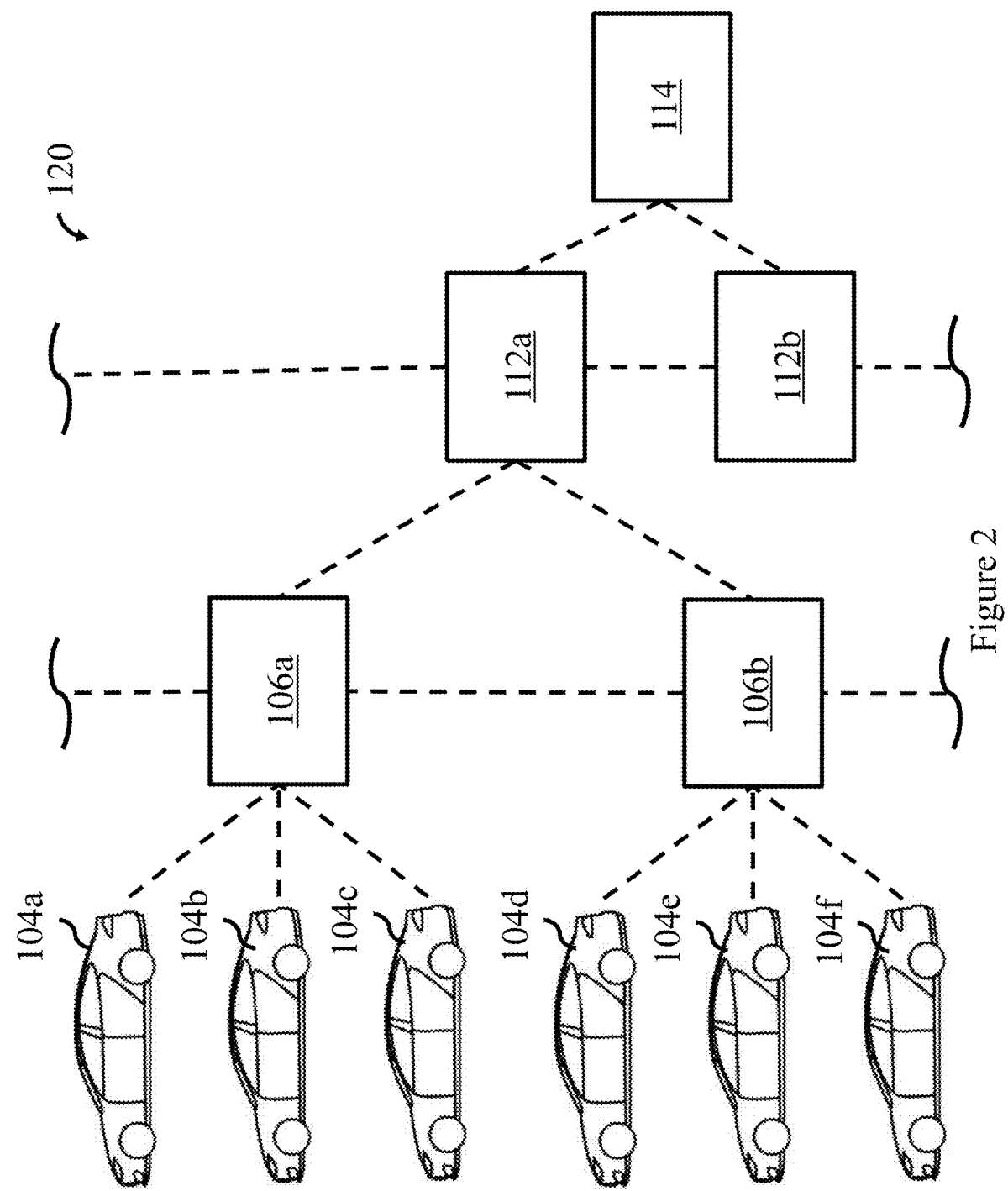
FIG. 2 is schematic representation of an example transit network.

FIG. 2 is schematic representation of an example transit network 120. The transit network 120 may include vehicles 104a-104f communicatively coupled to one or more RSUs 106a-b. The transit network 120 may also include localized servers 112a and 112b communicatively coupled to the RSUs 106a-b. The localized server 112a may be configured to receive and process data from the RSUs 106a-b, and the localized server 112b may be configured to receive and process data for other RSUs, which are not illustrated for brevity. In some configurations, the localized servers 112a and 112b may be regional servers configured to process data from RSUs in specific geographic location and/or region. The localized servers 112a and 112b may be communicatively coupled to a remote server 114. In some configurations, the remote server 114 may be a cloud-based server that receives and processes data from multiple RSUs located in different geographic areas or regions.

Although the schematic representation of the transit network 120 shown includes six vehicles 104, two RSUs 106, two localized servers 112, and one remote server 114, it should be appreciated that the transit network 120 may include any suitable number of vehicles, RSUs, localized servers and/or remote servers. In addition, in other configurations some of the components shown may be omitted, and/or other components not shown may be included in the transit network 120.

In some aspects, the described embodiments may include software on the RSUs 106. The software on the RSUs 106 may be stored in memory and executable by a processor, which may be included on the RSUs 106. Accordingly, the RSU 106 may be configured to process data received from the vehicles 104 and/or prioritize data received from the vehicles 104. Additionally or alternatively, the described embodiments may include software on the OBUs of the vehicles 104. The software on the OBUs may be stored in memory and executable by a processor, which may be included on the vehicles 104. Accordingly, the OBUs may be configured to process data received from the vehicles 104 and/or prioritize data received from the vehicles 104.

For example, the RSU 106 may receive a message that an airbag was deployed, indicating that one of the vehicles 104 was involved in an accident. Since this message is critical to safety, the RSU 106 may determine that the message is important and may immediately transmit the message to other vehicles in the area (e.g. the other vehicles coupled to the RSU 106). The RSU 106 may also transmit the message to the localized server 112a and/or the remote server 114, which may relay the message to emergency services, traffic operations, or other relevant entities. However, since the RSU 106 immediately transmits the message to other vehicles immediately, without first transmitting the message to the localized server 112a and/or the remote server 114 and receiving a response, the latency for other vehicles to receive the message is decreased.

In another example, the RSU 106 may receive a message that is not critical to safety, for example, a message indicating the vehicle hit a pothole. Since this message is not critical to safety, the RSU 106 may determine that the message is not important and may not transmit the message to other vehicles in the area. Instead, the RSU 106 may transmit the message to the localized server 112a and/or the remote server 114, which may relay the message to proper entities such as maintenance personnel, traffic operations, or other suitable entities. Since response time for such messages is not critical, latency for such messages may be greater, and the response may be processed by the localized server 112a and/or remote server 114, which may increase the latency. However, processing such data on the localized server 112a and/or remote server 114 but may be less resource intensive than processing and analyzing the data on the RSU 106, which may have limited processing resources.

In another aspect, the described embodiments may include software on the localized server 112a and/or the remote server 114. The software on the localized server 112a and/or the remote server 114 may be stored in memory and executable by a processor, which may be included on the localized server 112a and/or the remote server 114. Accordingly, the localized server 112a and/or the remote server 114 may be configured to process data received from the vehicles 104 and/or the prioritize data received from the vehicles 104. In some configurations, the remote server 114 may include distributed cloud resources to process the received data.

The localized server 112a and/or the remote server 114 may collect, aggregate, and process the data received from the RSUs 106 and the vehicles 104. In some configurations, the aggregated data is processed and visualized in an analytics platform.

In some configurations, the connected transit network 120 may be used to actively manage traffic, including adapting intersections based on real-time data exchanged via the transit network 120. If data received from the vehicles 104 or the RSUs 106 indicates that the vehicles 104 are experiencing a delay in certain location and/or a certain direction of travel, the transit network 120 may adapt the behavior of one or more intersections to mitigate traffic delays. For example, a delay may be caused by a car accident or an event such as a basketball game.

In some configurations, the decision of whether to process and/or aggregate data on the RSUs 106, localized servers 112 and/or the remote server 114 may depend on latency, processing and/or storage resources. In some circumstances, the remote server 114 may have more processing power and storage capabilities than the RSUs 106 and/or localized servers 112. In particular, the remote server 114 may be a cloud-based server with shared, distributed, and scalable processing resources and storage. In contrast, the RSUs 106 and/or localized servers 112 may have a fixed amount of processing resources and storage. Accordingly, it may be more efficient to perform some processing or memory-intensive tasks on the remote server 114. However, since the remote server 114 may be remotely located from the RSUs 106 and/or localized servers 112 (for example, in a different state or a different country), the latency to transmit data to and from the remote server 114 may be larger than the latency to transmit data between the RSUs 106 and the localized servers 112. Accordingly, if low-latency is important for certain data or processing tasks, this data may be processed and/or stored on the RSUs 106 or the localized servers 112. Accordingly, the connected transit network 120 may implement a distributed architecture to efficiently allocate resources according to various requirements and factors.

In some circumstances, the RSUs 106, the localized servers 112 and/or the remote server 114 may represent separate processing nodes that exchange information across distributed devices and different geographic locations. In some configurations, each of the RSUs 106, the localized servers 112 and/or the remote server 114 may process a portion of the data exchanged in the connected transit network 120.

The RSUs 106, the localized servers 112 and/or the remote server 114 may also receive data from other sources not described above. For example, the RSUs 106, the localized servers 112 and/or the remote server 114 may receive data such as road closure data, ramp metering data, weather data, and/or other relevant data.

Figure 3:
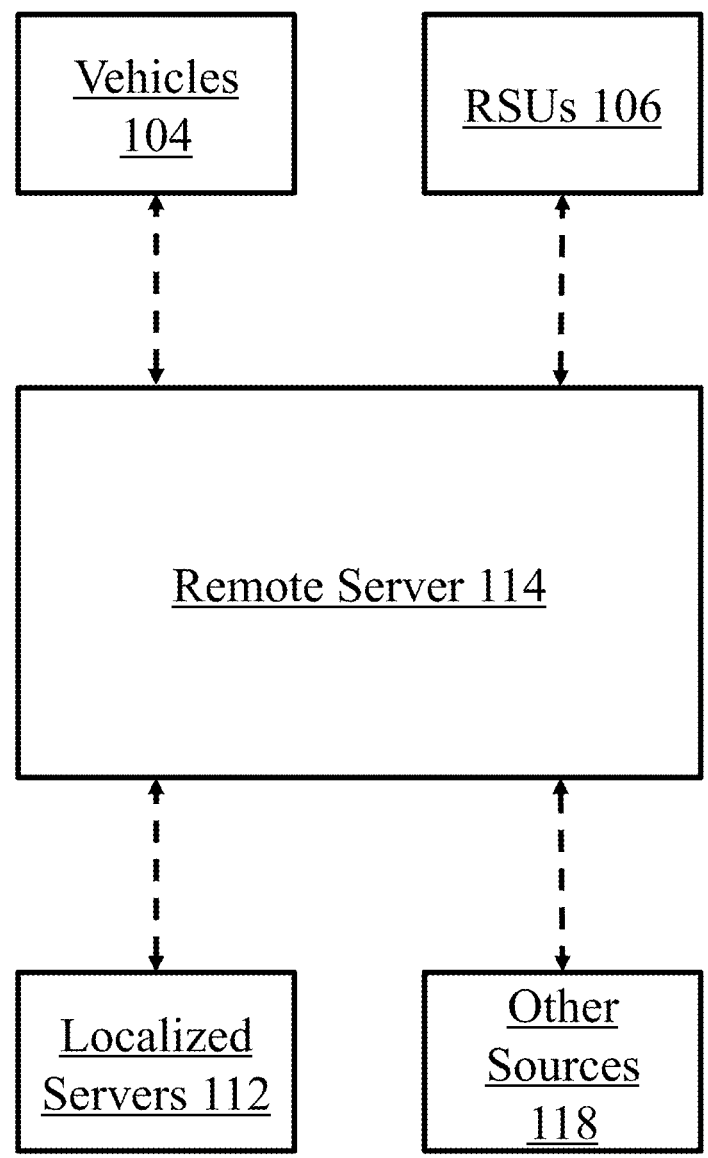
FIG. 3 is schematic representation of the remote server.

FIG. 3 is schematic representation of the remote server 114. As illustrated, the remote server 114 may receive signals from the vehicles 104, the RSUs 106, the localized servers 112, and/or other sources 118. The other sources 118 may include signal trackers or other suitable aspects described in U.S. Application No. 62/082,212, U.S. Application No. 62/127,638, U.S. Application No. 62/197,462, U.S. application Ser. No. 14/947,352, and/or U.S. Application No. 62/197,464, which are hereby incorporated by specific reference in their entirety.

In one implementation, the data may be received at the remote server 114, which may aggregate the data, use the aggregated data to identify the traffic delay, and formulate a response to be implemented by the transit network 120. Preparing a response to the traffic delay may include simulating different response scenarios, and determining a most effective response strategy based on the simulated scenarios. The remote server 114 may transmit instructions to one or more intersections (such as the intersection 100), the instructions may implement the response strategy determined by the remote server 114.

The response strategy may include changing the signal phase and timing of the intersection. For example, the intersection may increase the time a green light is displayed in a certain direction to remove congestion from a location or region (e.g., the location of the car accident or the basketball game). In some circumstances, the response strategy may include multiple intersections, so multiple intersections may increase the time a green light is displayed in a certain direction to remove congestion from a location or region. In such configurations, the traffic signals may be coordinated (for example, in sequence), so traffic is more efficiently removed from the location or region.

Although in this example the response strategy is prepared and implemented by the remote server 114, in other configurations the response strategy may be prepared and implemented by the localized server 112 or one or more of the RSUs 106. However, the remote server 114 may have increased processing and storage capabilities, and in some circumstances using the remote server 114 may be an efficient use of resources.

In some configurations, the RSU 106 may be configured to perform a method including actuating signal priority of a traffic signal controller after receiving a priority request via the RSU 106, either directly or via edge computing, conversely via a remote communication or a cloud based system. In one embodiment the system delivers intelligence. For example in an instance where there has been snow accumulation on the ground and an emergency vehicle and a snow plow both arrive at an intersection at nearly the same time, the system may determine it is in the best interest of the emergency vehicle to grant the snow plow priority to clear a path. The system may ingest data directly, for example via data feeds such as weather data, accident data or even predictive means to effectuate this sort of intelligence. In other configurations, the localized server 112 and/or the remote server 114 may be configured to perform the described aspects.

In some embodiments, the transit network 120 may implement edge computing. Edge computing may optimize cloud computing systems by performing data processing at the edge of the network, near the source of the data, such as the RSUs 106, vehicles 104, and/or the localized servers 112. This reduces the communications bandwidth needed between sensors and the remote server 114 by performing analytics and knowledge generation at or near the source of the data. This approach requires leveraging resources that may not be continuously connected to the computer network 110 such as laptops, smartphones, tablets, sensors (e.g., the RSUs 106 or the vehicles 104). Edge computing may include wireless sensor networks, mobile data acquisition, mobile signature analysis, cooperative distributed peer-to-peer ad hoc networking, local cloud/fog computing, grid/mesh computing, dew computing, mobile edge computing, cloudlet, distributed data storage and retrieval, autonomic self-healing networks, remote cloud services, augmented reality, and others.

The methods and systems described herein may prioritize and/or decide which computing or storage resources are used for various data in the connected vehicle transit network. For example, the methods and systems described herein may decide whether edge computing resources, local computing resources, and/or cloud computing resources are used for certain information based on a variety of considerations, as described herein.

Connected Roadway Markers

Figure 4:
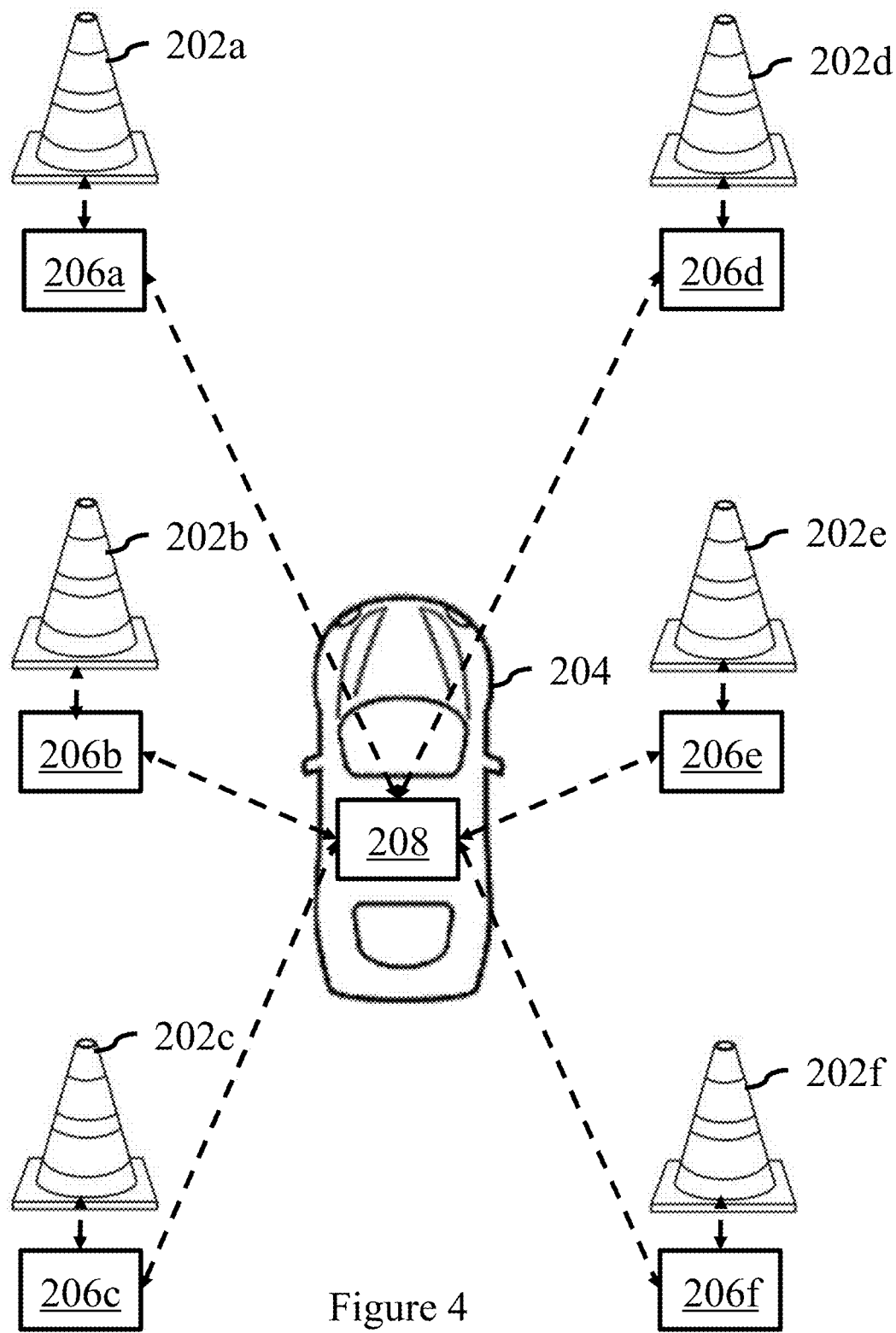
FIG. 4 is a schematic representation of a portion of a roadway.

FIG. 4 is a schematic representation of a portion of a roadway 200. As illustrated, a vehicle 204 may be travelling on the roadway 200. The vehicle may include an OBU 208. The roadway may include roadway markers 202*a-f*. In the illustrated configuration, the roadway markers 202*a-f* are traffic cones, however, any suitable roadway markers may be implemented. For example, the roadway markers 202*a-f* may be traffic signs, barricades, pylons, walls, or any other roadway marker.

Each of the roadway markers 202*a-f* may be physically and communicatively coupled to a corresponding communication module 206*a-f*. In some configurations, the communication modules 206*a-f* may include RSUs, such as the RSUs 106 described above. Additionally or alternatively, the communication modules 206*a-f* may include a GPS, for example a GPS chip. While many GPS are generally accurate to approximately 9 to 16 feet (3 to 5 meters), some GPS are expected to have increased accuracy. For example, some GPS may have an accuracy of approximately 1 foot (30 centimeters).

In some configurations, the communication modules 206*a-f* may have a GPS with increased accuracy, for example, with an accuracy approximately 1 foot (30 centimeters). In such configurations, the GPS may be used to accurately determine the positions of each of the roadway markers 202*a-f*. In particular, the each of the GPS coupled to the roadway markers 202*a-f* may continuously or incrementally determine the position of the roadway markers 202*a-f*. This position data may be sent to the OBU 208 of the vehicle 204, or it may be sent to a localized or remote server. The vehicle 204 may use the data regarding the precise locations of the roadway markers 202a-f to more effectively navigate the roadway 200.

In some configurations, the position data may be sent to a localized or remote server (such as the localized servers 112 or remote server 114). The position data may be aggregated and distributed to vehicles traveling through the roadway 200, such as the vehicle 204. For example, the localized or remote server may aggregate the position data to generate virtual lines that represent the positions of the roadway markers 202a-f. The virtual lines may indicate a suitable travel path for the vehicle 204 to travel between or around the roadway markers 202a-f.

In other configurations, the position data may be sent directly to the OBU 208 of the vehicle 204. In such configurations, the OBU 208 may aggregate the position data received from the roadway markers 202a-f, for example, to generate virtual lines. However, in such configurations the OBU 208 may be required to have a greater amount of on-board processing power and/or storage capabilities. In contrast, if the position data is aggregated via a localized or remote server, the OBU 208 may not be required to have as much on-board processing power and storage capability.

The RSUs 106, the OBU 208, the localized servers 112 and/or the remote server 114 may be implemented in a computing device. Additionally or alternatively, the computing device 600 may be configured to perform any of the methods described herein.

Methods to Actuate Connected Traffic Signals

As mentioned, the embodiments described may be implemented to perform methods to actuate traffic signals. In particular, various components of the systems described may actuate traffic signals or send requests to the traffic signal controller to update or change timing plans, execute signal requests or the like. In some configurations, RSU's (such as the RSU 106 of FIGS. 2-3), may perform the methods to actuate traffic signals, for example, based on priority. In another example, localized servers or remote servers (such as the localized server 112 or the remote server 114 FIGS. 2-3), may perform the methods to actuate traffic signals, or to utilize RSU's as network router to access signal controllers for traffic signals or other intelligent transportation systems (ITS) capable of actuating traffic signals. Furthermore, distributed resources may perform the methods described, such as any suitable combination of any of: connected vehicles, RSU's, localized servers, remoted servers, or other components of the system. The systems may perform the methods either directly or via edge computing, as described above.

The methods described may be implemented, for example, by transportation agencies to improve traffic flow by using vehicle data (which may be anonymous and may not compromise personal information) to identify real-time road conditions and/or historic data. Such data may be used to help agencies better plan and allocate resources, and improve traffic flow.

Traffic flow may be improved by actuating signals based on various data sources described, such as information from connected vehicles, RSU's, and/or other sources. Improved traffic flow may result in vehicles that are more safe, fast and efficient because of real-time information exchange using connected vehicle technology. Additionally or alternatively, optimizing traffic flow may lead to decreased vehicle emissions. In some configurations, the methods described may be implemented using DSRC technology, either in a vehicle-to-vehicle (V2V) or vehicle-to-infrastructure (V2I) configuration.

Figure 5:
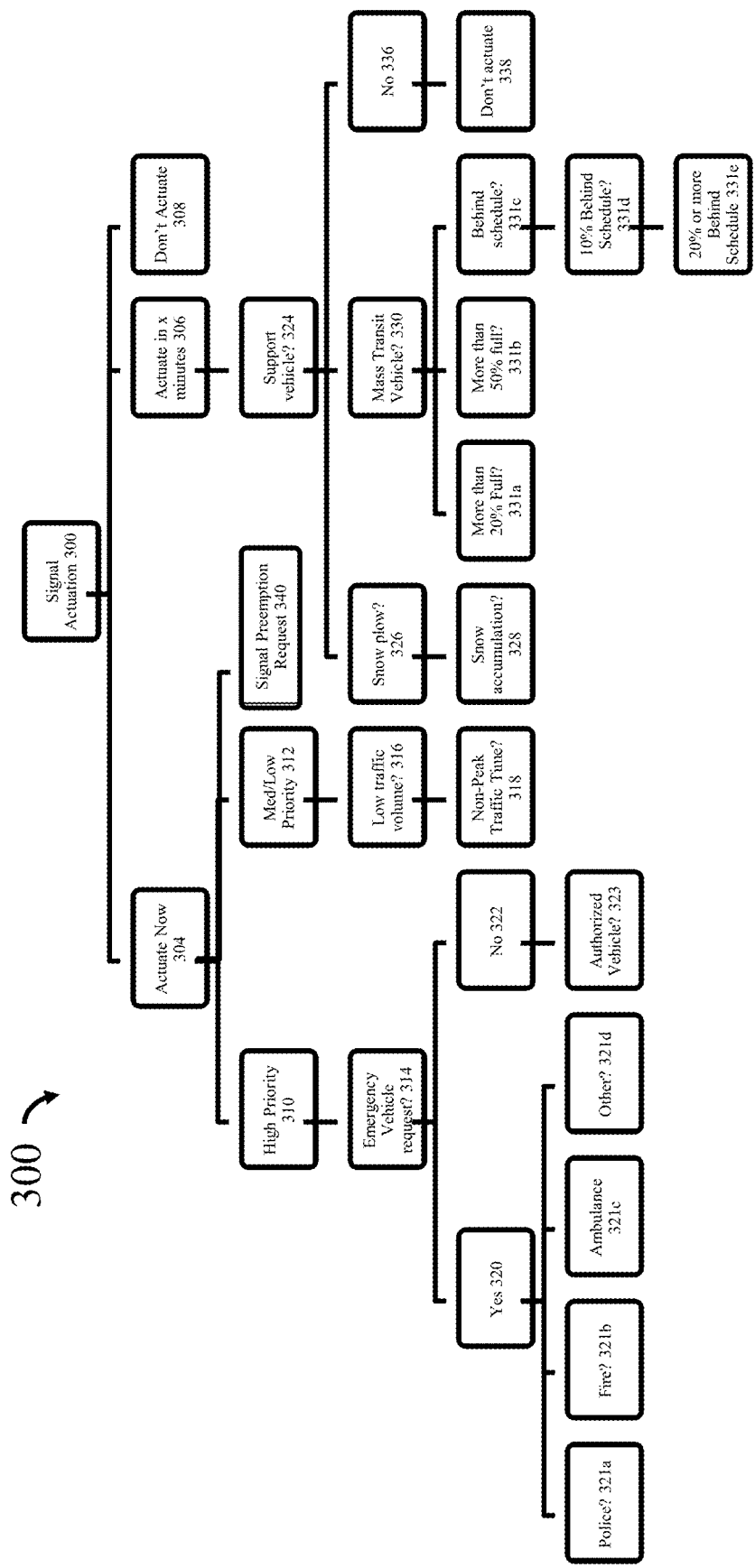
FIG. 5 is a flowchart of an example method of traffic signal actuation.

In some circumstances, the configuration of the embodiments described herein may depend on configurations of the actuated signal controller (ASC) that controls a traffic signal, for example, to make decisions based on current signal phase, preprogrammed plans, etc. An RSU or an OBU communicatively coupled to the ASC may transmit a request to the ASC, for example, to update or change timing plans, execute signal requests or the like FIG. 5 is a flowchart of an example method 300 of traffic signal actuation. The method 300 may determine whether a traffic signal is actuated immediately (e.g., actuate now 304), whether a traffic signal is actuated after a specified amount of time has passed (e.g., actuate in x minutes 306), and/or whether a traffic signal is not actuated (e.g., don't actuate 308). As used herein, actuating a traffic signal may refer to changing the status or the display of the traffic signal. For example, in some configurations actuating a traffic signal may refer to changing the traffic signal from red to green (or vice versa), to permit traffic in one direction to proceed through the intersection, or to prevent traffic in one direction from proceeding through the intersection. When a traffic signal is actuated in a first direction, for example, to permit traffic to proceed in one direction, it may also be actuated in a corresponding manner for a second direction, for example, to prevent traffic from proceeding through the intersection.

Although this example uses a traffic signal that displays red and green colors to indicate whether traffic is permitted to proceed through the intersection or not, some traffic signals may have other configurations for displaying whether traffic is permitted to proceed through the intersection or not. For example, a traffic signal may display words such as "Go" or "Stop" to indicate whether traffic is permitted to proceed through the intersection. In another example, a traffic signal may display arrows indicating which direction traffic is permitted to proceed through the intersection. Other suitable traffic signal configurations may also be implemented. The concepts described herein may be applied to any suitable traffic signal configuration.

The method 300 may determine whether the traffic signal is actuated immediately at step 304. In some configurations, the traffic signal may be actuated immediately based on a variety of factors, such as real-time traffic data and/or based on the type of vehicles at or near the intersection. For example, the traffic signal may be actuated immediately based on a level of urgency associated with the real-time traffic data and/or the type of vehicles at or near the intersection. Since actuating the traffic signal immediately is a relatively drastic response that may affect the flow of traffic in other directions, the traffic signal may be actuated immediately only for a high (or the highest) level of urgency associated with the real-time traffic data and/or the type of vehicles at or near the intersection. For example, the traffic signal may be actuated immediately for emergency vehicles responding to an imminent emergency.

In other configurations, the traffic signal may be actuated immediately even when there is no high level of urgency or emergency vehicle. For example, the traffic signal may be actuated immediately if a vehicle is approaching the intersection and there is no cross-traffic to disrupt in the other direction, then the traffic signal may be actuated to permit the approaching vehicle to travel through the intersection without stopping (or without slowing down). Such configurations may optimize the flow of traffic through the intersection without disturbing traffic flow in other directions (e.g., because traffic is not flowing in the other direction).

In some configurations, the method 300 may include changing the operation, timing, or actuation of the traffic signal to improve safety. For example, if a pedestrian is in an intersection, the method may include preventing the traffic signal from activating or changing. Additionally or alternatively, the method may include preventing the signal priority from changing or actuating, to prevent injury to the pedestrian. In further configurations, the method 300 may increasing the length of a yellow light in response to certain conditions, such as a wet, icy, or otherwise slippery roads.

As mentioned above, the method 300 may include determining whether the traffic signal is actuated after a specified amount of time has passed at step 306. In the illustrated example, the method 300 may determine to actuate the traffic signal after x minutes. In some configurations, x may be a predetermined or pre-assigned number of minutes. In other configurations, x may be selected based on a variety of factors, as will described herein. For example, x may be selected based on real-time traffic data and/or based on the type of vehicles at or near the intersection. Specifically, x may be selected based on a factor such as a level of urgency associated with the real-time traffic data and/or the type of vehicles at or near the intersection (e.g., how full a public transportation vehicle is, to prevent traffic jams further down the road from the intersection, etc.). Although in this example x is denoted with units of minutes, x may be denoted with any suitable time interval or delay (e.g., seconds, milliseconds, hours, or fractions thereof). Additionally or alternatively, x may represent a fraction of a predetermined standard time interval for the traffic signal to change under normal operation. The predetermined standard time interval may be adjusted to be shorter or longer based on the various factors or considerations described herein.

The method 300 may determine whether the traffic signal should not be actuated at step 308. In such circumstances, the traffic signal may continue normal operation. The traffic signal may not change from its current state and may continue to permit traffic to flow through the intersection without making changes. For example, the traffic signal may continue to display certain colors in each of the directions through the intersection (e.g., green in one direction and red in another). Additionally or alternatively, if the traffic signal is timed or has an algorithm for normal operation, the traffic signal may be continue through the algorithm for normal operation or timing sequence. The traffic signal not being actuated may refer to the normal operation of the traffic signal not being modified. In contrast, the traffic signal being actuated may refer to the normal operation of the traffic signal being modified at least to some extent.

In some configurations of the method 300, the determination to actuate the traffic signal may be based on a signal preemption request 340. The signal preemption request 340 may be received from a vehicle at or near the intersection corresponding to the traffic signal (e.g., the vehicles 104 of FIGS. 1-3). In other configurations, the signal preemption request 340 may be received from the RSUs or other components of the system.

The method 300 may include determining the priority of the signal preemption request 340. In some configurations, the priority of the signal preemption request 340 may be included in the signal preemption request 340. In such configurations, the priority may be extracted from the received signal preemption request 340. In other configurations, the priority of the signal preemption request 340 may be determined based on various factors associated with the signal preemption request 340. For example, the priority of the signal preemption request 340 may be determined based on a level of urgency associated with various aspects of the signal preemption request 340.

At step 310, a high priority of the signal preemption request 340 may be determined. The high priority may be determined based on an elevated or high level of urgency associated with the signal preemption request 340. For example, a high priority may be assigned for emergencies or other important aspects that may correspond with the signal preemption request 340.

At step 314, whether the signal preemption request 340 came from an emergency vehicle may be determined. If the signal preemption request 340 came from an emergency vehicle, then it may be considered an emergency vehicle request. In some configurations, information regarding whether the signal preemption request 340 came from an emergency vehicle may be included in the signal preemption request 340. In such configurations, this information may be extracted from the received signal preemption request 340. In other configurations, whether the signal preemption request 340 came from an emergency vehicle may be determined based on various factors associated with the signal preemption request 340, such as information regarding the source of the signal preemption request 340.

If it is determined that the signal preemption request 340 came from an emergency vehicle at step 314, the method may proceed to step 320, and the traffic signal may be actuated (see, e.g., step 304).

In some configurations, the method 300 may proceed to determining what type of emergency vehicle is associated with the signal preemption request 340. For example, the emergency vehicle may be determined to be a police vehicle 321a, a fire vehicle 321b, an ambulance 321c, or another emergency vehicle 321d. In some configurations, information regarding what type of emergency vehicle may be included in the signal preemption request 340. In other configurations, information regarding what type of may be determined based on various factors associated with the signal preemption request 340, such as information regarding the source of the signal preemption request 340.

If it is determined that the signal preemption request 340 did not come from an emergency vehicle at step 314, the method may proceed to step 322, and the traffic signal may not be actuated (see, e.g., step 308). Additionally or alternatively, the method 300 may proceed to step 323, in which whether or not the vehicle is an authorized vehicle may be determined. In some configurations, whether the vehicle is an authorized vehicle may be included in the signal preemption request 340. In other configurations, whether the vehicle is an authorized vehicle may be determined based on various factors associated with the signal preemption request 340, such as information regarding the source of the signal preemption request 340. [0086] In some circumstances, non-emergency vehicles may be assigned emergency vehicles status in certain circumstances. For example, a vehicle carrying a government official may in some circumstances be assigned emergency vehicles status. In such circumstances, the non-emergency vehicle may send the signal preemption request 340 and it may be determined that such a request has high priority, as if it came from an emergency vehicle.

In some configurations, the method 300 may include taking action based on whether the vehicle is an authorized vehicle. For example, if the vehicle is not authorized then the traffic signal may not actuated (see, e.g., step 308), and if the vehicle is authorized then the traffic signal may be actuated (see, e.g., step 304). In another example, if the vehicle is not authorized then the traffic signal (or other components of the system) may report that an unauthorized vehicle sent the signal preemption request 340. The report may result in additional actions being taken in response to the unauthorized vehicle sending the signal preemption request 340.

At step 312, a low priority or a medium priority of the signal preemption request 340 may be determined. The low or medium priority may be determined based on level of urgency associated with the signal preemption request 340, which may be low or medium (or not high). For example, a low or medium priority may be assigned for circumstances that are not emergencies or other important aspects.

Although the signal preemption request 340 may be determined to be low or medium priority, the traffic signal may nevertheless be actuated in some circumstances. For example, at step 316, low traffic volume may be determined. In response to the low traffic volume being determined, the traffic signal may be actuated. For example, the traffic signal may be actuated the vehicle that sent the signal preemption request 340 is approaching the intersection and there is no cross-traffic to disrupt in the other direction. Accordingly, in some configurations the low traffic volume may correspond to cross traffic. In response to a high traffic volume being determined, the traffic signal may not be actuated (e.g., if there is a high volume of cross traffic).

In another example, at step 318, whether the current time is within a non-peak traffic time range may be determined. In response to the current time being within a non-peak traffic time range, the traffic signal may be actuated (see, e.g., step 304). In response to the current time being within a peak traffic time range, the traffic signal may not be actuated (see, e.g., step 308).

In some configurations, the method 300 may include determining or calculating the potential or historical impact that priority has had on the traffic signal, the traffic system, other traffic signals, other roads or approaches. Furthermore, the method 300 may include determining when, where, and to what type of vehicles priority should be assigned to based on the determined potential or historical impact.

As mentioned, at step 306 whether the traffic signal should be actuated after a specified amount of time has passed may be determined. In some circumstances, the determination may be made in response to determination that a vehicle is a support vehicle.

At step 324, whether the signal preemption request 340 came from a support vehicle may be determined. In some configurations, information regarding whether the signal preemption request 340 came from a support vehicle may be included in the signal preemption request 340. In such configurations, this information may be extracted from the received signal preemption request 340. In other configurations, whether the signal preemption request 340 came from a support vehicle may be determined based on various factors associated with the signal preemption request 340, such as information regarding the source of the signal preemption request 340.

If it is determined that the signal preemption request 340 came from a support vehicle at step 324, the traffic signal may be actuated (see, e.g., step 304).

In some configurations, the method 300 may proceed to determining what type of support vehicle is associated with the signal preemption request 340. For example, the support vehicle may be determined to be a snow plow, a mass transit vehicle, or other type of support vehicle.

At step 326, the support vehicle may be determined to be a snow plow. If the support vehicle is determined to be a snow plow, the method may proceed to step 328, in which whether there is snow accumulation may be determined. Whether there is snow accumulation may be determined based on information from vehicles, RSUs, or sources external to the system. In some circumstances, weather data may be obtained based on real-time data, for example, from weather services or databases, or cloud connected weather monitoring equipment. In other circumstances, snow accumulation may be based on predicted weather information rather than real-time data. If it is determined that there is snow accumulation the traffic signal may be actuated (see, e.g., step 304), otherwise the traffic signal may not be actuated (see, e.g., step 308).

At step 330, the support vehicle may be determined to be a mass transit vehicle. If the support vehicle is determined to be a mass transit vehicle, the method may proceed to determine a factor associated with the mass transit vehicle. In one aspect, a level of capacity of the mass transit vehicle may be a factor. For example, whether the mass transit vehicle is more than 20% full may be determined at step 331a. In another example, whether the mass transit vehicle is more than 50% full may be determined at step 331b.

In another aspect, a level that a mass transit vehicle is behind schedule may also be determined and may be a factor. For example, whether the mass transit vehicle is behind schedule may be determined at step 331c. For example, whether the mass transit vehicle is 10% behind schedule may be determined at step 331d. In another example, whether the mass transit vehicle is 20% or more behind schedule may be determined at step 331e. The traffic signal may be actuated or not actuated based on such factors. In another aspect, whether the mass transit vehicle is going to miss a connecting stop (e.g., a connection or transfer with another mass transit vehicle) may also be determined and may be a factor.

Steps 331a-e may be determined based on real-time data or a signal preemption request 340. For example, the mass transit vehicle may be tracked in real-time to determine whether the mass transit vehicle is behind schedule (and the extent it is behind schedule). In another example, the extent that the mass transit vehicle is full or on-schedule may be based on the signal preemption request 340.

At step 336, the support vehicle may be determined to be a vehicle other than a snow plow or mass transit vehicle (e.g., another type of support vehicle). If the support vehicle is determined to be a vehicle other than a snow plow or mass transit vehicle, the method may proceed to step 338, in which the traffic signal may not be actuated (see, e.g., step 308).

In one example embodiment, a method may be implemented to prioritize and analyze data exchanged in a connected vehicle transit network. The method may include receiving, at a roadside unit, vehicle data from a connected vehicle; and prioritizing the vehicle data received from the connected vehicle based on a level of urgency, network latency or available computing resources.

In some aspects, prioritizing may include determining a level of urgency based on whether or not the vehicle data indicates an event critical to safety. The method may include transmitting a message to other vehicles in the area of the connected vehicle in response to determining that the vehicle data indicates the event is critical to safety. The method may include transmitting a message to a localized server or a remote server in response to determining that the vehicle data indicates the event is not critical to safety.

The prioritizing may include determining whether the vehicle data should be processed at the roadside unit, a localized server, or a remote server based on the level of urgency, the network latency or the available computing resource.

The method may include transmitting the vehicle data from the roadside unit to a server, and collecting, aggregating, and processing the vehicle data received from the roadside unit at the server. The method may include adapting intersections to manage traffic in real-time based on the vehicle data received from the connected vehicle. The method may include receiving signal phase and timing data, at the connected vehicle, from the roadside unit. The method may include changing the behavior of the connected vehicle based on the signal phase and timing data received from the roadside unit. The method may include changing the signal phase and timing of at least one of the intersections. The method may include processing the vehicle data using edge computing resources. In some aspects of the method, the vehicle data may be exchanged between the connected vehicle and the roadside unit using dedicated short-range communication (DSRC), mobile communication signals (e.g., 4G LTE, 5G, etc.), WiFi, Bluetooth, etc. The vehicle data may include speed, acceleration, engine performance, trajectory, intended destination, an indicator of an accident, or a combination thereof.

In another example embodiment, a method may be implemented to actuate a traffic signal to improve traffic flow. The method may include receiving a signal preemption request at roadside unit from a connected vehicle, determining a priority of the signal preemption request, and determining whether to actuate the traffic signal immediately or after a specified amount of time has passed based on the priority of the signal preemption request.

The priority of the signal preemption request may be determined based on a level of urgency associated with the signal preemption request. The priority of the signal preemption request may be determined based on the type of connected vehicle associated with the signal preemption request. The priority of the signal preemption request may be determined to be high based on the connected vehicle being an emergency vehicle. The traffic signal may be actuated immediately in response to the determination that the priority of the signal preemption request is high.

The priority of the signal preemption request may be determined to be low based on the connected vehicle being a snow plow or mass transit vehicle. The traffic signal may be actuated after the specified amount of time has passed in response to the determination that the priority of the signal preemption request is low. The connected vehicle may be a snow plow, and the actuation of the traffic signal may depend on whether there is snow accumulation on a roadway associated with the snow plow. The connected vehicle may be a mass transit vehicle, and the actuation of the traffic signal may depend on a level of capacity of the mass transit vehicle or level that a mass transit vehicle is behind schedule.

The traffic signal may be actuated in response to low cross-traffic volume associated with the connected vehicle. The actuation of the traffic signal may depend on whether the current time is within a peak traffic time range. The signal preemption request may be exchanged between the connected vehicle and the roadside unit using dedicated short-range communication (DSRC).

Method for Classifying and Detecting Congestion Based on Real Time Traffic Data from a Network of Sensors In some configurations, the embodiments described may be implemented to track, model, and/or predict the flow of traffic through segments of roads or intersections. For example, the flow or travel of connected vehicles may be tracked in real-time, and future travel may be predicted based on the real-time data. In some circumstances, the real-time data may be combined with historical data for modeling or other real-world, historical, or real-time datasets such as volumes, ramp meters, pedestrian push button activation, weather, etc. Furthermore, in some configurations connected transit networks, such as those described above, may be implemented to track connected vehicles traveling through roadways and intersections. The connected transit networks may also be used to predict the flow of traffic through intersections, and take actions to manage traffic based on real-time data or predicted traffic flow. For example, the connected transit networks may identify existing traffic jams and actuate traffic signals to remedy traffic jams. In another example, the connected transit networks may predict impending traffic jams or collisions and actuate traffic signals to prevent traffic jams or decrease impacts of traffic jams.

The embodiments described herein may be used to estimate parameters in a macroscopic fundamental diagram of traffic flow. The macroscopic fundamental diagram of traffic flow may be a diagram that gives a relation between the traffic flow (e.g., in vehicles/hour) and the traffic density (e.g., vehicles/km). A macroscopic traffic model involving traffic flow, traffic density and/or velocity may be used to predict the capability of a road system, or changes in its behavior in difference circumstances, such as inflow regulation or speed limits.

In some circumstances, the flow of traffic may generally be categorized into either free flow or congested flow, and traffic may behave differently in free flow and congested flow. Traffic data, for example, from connected vehicles or connected transit networks, may be used to determine whether traffic is free flowing or congested.

The embodiments described herein may be implemented to classify whether a segment of roadway is congested or in free flow in real time. For example, in some configurations, wireless re-identification technology may be implemented to determine whether a segment of freeway is congested or in free flow in real time. Wireless technology that may be used for re-identification may include WiFi, Bluetooth, TPMS, DSRC, magnetic re-identification or another suitable wireless format. In other configurations, radar, loop, magnetic counting or any other suitable method or technique may be used to obtain data regarding whether segment of freeway is congested or in free flow in real time. The real time data may then be used to predict future behavior in the segment of roadway. For example, traffic jams or congestion may be predicted based on the real time data.

Aspects of tracking, modeling, and/or predicting the flow of people or traffic is described in U.S. Non-Provisional application Ser. No. 15/910,782 filed Mar. 2, 2018; U.S. Non-Provisional application Ser. No. 14/947,352 filed Nov. 20, 2015; U.S. Provisional Application No. 62/197,464 filed Jul. 27, 2015; U.S. Provisional Application No. 62/197,462 filed Jul. 27, 2015; U.S. Provisional Application No. 62/127,638 filed Mar. 3, 2015; U.S. Provisional Application No. 62/466,242 filed Mar. 2, 2015; U.S. Provisional Application No. 62/345,598 filed Jun. 3, 2016; and U.S. Provisional Application No. 62/082,212 filed Nov. 20, 2014 which are incorporated herein by specific reference in their entirety.

The embodiments described herein may be implemented for anonymous re-identification, meaning that a target may be identified and/or re-identified without obtaining personally identifiable information about the target. Additionally or alternatively, targets may be identified and/or re-identified without obtaining privacy violating information about the target, thereby preserving the privacy of the target (e.g., vehicles and/or people traveling through an area).

In some circumstances determining whether a section of roadway is congested may present various challenges, and such challenges may be solved by the embodiments described herein. For example, data related to travel time estimates may be noisy due to the large detection radius of signal detecting sensors. Also, the volume of traffic may not be well-estimated because the sensors collect device transmissions and the probability of transmitting within the sensor radius may be dependent on the travel speed of the transmitting device (e.g., a vehicle with the transmitting device inside). To classify the state of traffic, estimates of both travel time and volume may be necessary because they may be used to describe the efficiency of a particular segment of roadway.

In some configurations, clustering techniques may be implemented to estimate parameters, for example, in a macroscopic fundamental diagram. One example of a clustering technique is described in J. Kianfar and P. Edara, "A Data Mining Approach to Creating Fundamental Traffic Flow Diagram," Procedia—Social and Behavioral Sciences, vol. 104, pp. 430-439, 12 2013, which is hereby incorporated by reference in its entirety. Clustering techniques may be advantageous because identifying or calculating free flow speed and/or other parameters may not be required to implement them. In some large-scale sensor networks, sensor placement may be approximate and road parameters may not always be available. Accordingly, clustering techniques, which do not require calculating free flow speed and/or other parameters, may be advantageous in such sensor networks where this data may not be available.

In the embodiments described herein, clustering may be implemented to build a model, which may then be used for real-time classification of data points, or groups of data points (rather than simply for static/historical analysis). In addition, the embodiments described may provide a probability (corresponding to a model's certainty), that a particular data point indicates free-flow or congestion, which is referred to as "jam probability." In addition, the embodiments described herein apply the clustering and modeling techniques to re-identification data, as well as connected vehicle data, to classify data points and predict future congestions (e.g., jam probability). Furthermore, the embodiments described improve upon the clustering method by running multiple times or repeatedly, and either choosing the best model according to disclosed metrics or running an optimization algorithm to iteratively search for better models.

In some of the disclosed embodiments, Gaussian Mixture Model clustering is implemented to estimate traffic flow parameters based on detected real-time data. A Gaussian Mixture Model may represent a composite distribution whereby points are drawn from one of k Gaussian sub-distributions, each with its own probability. The Gaussian Mixture Model may use an Expectation Maximization algorithm to fit the best two Gaussians to the data, for example, real-time data. Each data point in this model may be obtained using an estimate of the mean vehicle speed, an estimate of the current flow (e.g., vehicles per minute), and an estimate of the current segment occupancy (e.g., vehicles per mile). These estimates may be calculated from the real time data, such as re-identification data obtained from a network of sensors, as will be described herein. This disclosure also describes the parameters that may be used to build the models (e.g., the Gaussian Mixture Model), and the results of the clustering algorithm.

Figure 6:
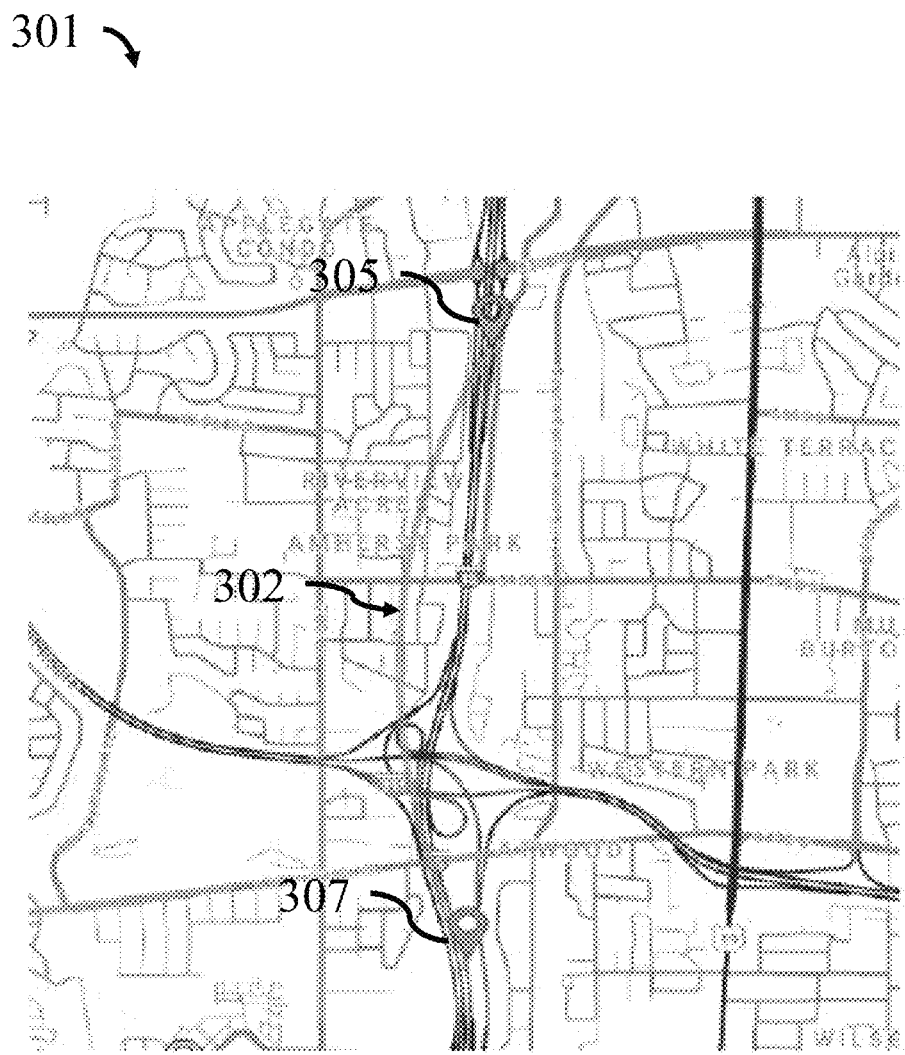
FIG. 6 is an example of a segment of roadway in a geographic area.

FIG. 6 is an example of a segment of roadway 302 in a geographic area 301. The segment of roadway 302 may be a section of interstate, for example, in the geographic area 301. The segment of roadway 302 may begin at point 305 (e.g., starting point) and extend to point 307 (e.g., end point). In this example, traffic may travel southbound from point 305 and point 307, as the traffic travels along the segment of roadway 302. Traffic traveling in the geographic area 301 may be tracked by a network of sensors that gather information regarding the traffic by receiving wireless signals from devices corresponding to vehicles. In some circumstances, the devices corresponding to vehicles may be anonymously identified and/or re-identified as they travel through the geographic area 301.

In the illustrated configuration, a first sensor (e.g., start-Sensor) may be positioned at point 305 a second sensor (e.g., endSensor) may be positioned at point 307. The sensors 305, 307 may receive wireless signals from devices as they travel southbound on the segment of roadway 302. For example, the first sensor 305 may receive a wireless signal as a vehicle passes the first sensor 305 (or is in proximity to the first sensor 305), and then the second sensor 307 may receive another wireless signal as the vehicle passes the second sensor 307 (or is in proximity to the second sensor 307).

FIG. 7 illustrates a method 400 for building a segment traffic model by clustering estimates of speed, occupancy, and flow. The method 400 may correspond to a method of building a segment traffic model by clustering estimates of speed, occupancy, and flow, as will be described herein.

At step 402, a timeframe or date range may be selected (e.g., dateRange). In the illustrated example, a date range of three months is selected, although any suitable range may be implemented. The method may include considering, evaluating, and/or calculating match data between two sensors (e.g., startSensor and endSensor) that correspond to a segment of roadway (e.g., the segment of roadway 302 of FIG. 1) for the selected range. Match data may include data indicative of a mobile device travelling between the two sensors (e.g., startSensor and endSensor) in the segment of roadway 302. For example, real time data, such as re-identification data obtained from the sensors, may be used to identify a device at the startSensor and then at the endSensor at a later time within the selected range (e.g., dateRange).

At step 404, a distance between the startSensor and the endSensor may obtained (e.g., distance). In some aspects, a difference in position between the startSensor and the endSensor may be calculated to obtain the distance between the startSensor and the endSensor (e.g., distance). In other aspects, the distance could be calculated from a segment of roadway, for example, if the data being classified is from connected vehicles. In further aspects, BSMs may be used to obtain the distance, because BSMs may include geographically referenced information, so any length of roadway can be analyzed by filtering data that exists in that length.

At step 406 a time range, segment and/or duration may be selected (e.g., windowDuration). In the illustrated example, a time range of 60 minutes is selected, although any suitable range may be implemented. The duration windowDuration may be the maximum elapsed time that may pass between the two sensors (e.g., startSensor and endSensor) receiving data indicative of a mobile device. For example, if a mobile device passes both the startSensor and the endSensor within 60 minutes, then a match is determined. However, if a mobile device passes the startSensor and the endSensor outside of the 60 minute windowDuration, then a match is not determined. In some configurations, the windowDuration may be selected based on the expected mode of transportation of the mobile devices travelling. For example, vehicles on a given section of roadway may be expected to travel at a certain speed or range of speeds. In addition, vehicles travelling in congested and free flow may be expected to travel at different speeds. The method may include considering, evaluating, and/or calculating match data between two sensors (e.g., startSensor and endSensor) that correspond to a segment of roadway (e.g., the segment of roadway 302 of FIG. 1) for the selected duration windowDuration. Match data may include data indicative of a mobile device travelling between the two sensors (e.g., startSensor and endSensor) in the segment of roadway 302 for the windowDuration. For example, real time data, such as re-identification data obtained from the sensors, may be used to identify a device at the startSensor and then at the endSensor at a later time within the duration windowDuration.

At step 408, a slide duration may be selected (e.g., slideDuration). In the illustrated example, a slide duration of 5 minutes is selected, although any suitable range may be implemented. The duration windowDuration may be selected based on the desired sensitivity of the classification. For example, a large windowDuration averages more data points together, which is more robust against high-frequency noise due to sensor variations, but also causes the model to require more data points to be certain about the state of traffic. Smaller windowDuration is more sensitive to changes in traffic, such as rolling jams or collisions, however it is also more sensitive to sensor variation and may cause false-positives.

At step 410, data may be re-sampled in windowDuration time segments at slideDuration increments and each window is summarized by estimated flow (q), occupancy (k), and speed (v). FIG. 7 indicates feature vectors that may be used for clustering.

At step 412, the number of matches may be counted (e.g., count). The number of matches may be counted based on match data calculated between two sensors (e.g., startSensor and endSensor) that correspond to a segment of roadway (e.g., the segment of roadway 302 of FIG. 1) for the selected duration windowDuration. The counted number of matches may indicate the number of mobile devices or vehicles detected travelling between the two sensors (e.g., startSensor and endSensor) on the segment of roadway 302 for the selected duration windowDuration.

At step 414, the mean travel time of the mobile devices or vehicles may be calculated (e.g., meanTravelTime). The mean travel time may be calculated by obtaining the mean of the travel time of match data of matches indicating the number of mobile devices or vehicles detected travelling between the two sensors (e.g., startSensor and endSensor) on the segment of roadway 302 for the selected duration windowDuration. In particular, the travel time of one mobile device or vehicle may be obtained by comparing or finding the difference in time between detection at the startSensor and detection at the endSensor. The average or mean travel time of multiple mobile devices or vehicles may be obtained by averaging the travel times to obtain the meanTravelTime.

At step 416, the mean speed of the mobile devices or vehicles may be calculated (e.g., speed). The mean speed may be calculated by obtaining the mean of the distance between the startSensor and the endSensor divided by the mean travel time of the mobile devices or vehicles (e.g., distance/meanTravelTime). The average or mean speed of multiple mobile devices or vehicles may be obtained by averaging the result of distance divided by the mean travel time.

At step 418, the flow of traffic may be calculated (e.g., flow). The flow may be calculated by multiplying the mean speed of the mobile devices or vehicles by the windowDuration divided by 60 (e.g., count*windowDuration/60). The flow may represent a relationship that depends on the number of vehicles present per second, and in the case of BSMs or re-identification data relates the number of data points received per seconds to the number of cars present per second.

At step 420, the occupancy may be calculated (e.g., occupancy). The occupancy may be calculated by dividing the flow by speed (e.g., flow/speed). The occupancy may represent a relationship that depends on the number of vehicles.

At step 422, a clustering algorithm may be applied to the data (e.g., model cluster). The clustering algorithm may be applied to the calculated speed, flow, and occupancy with a k value of 2, where k represents the expected number of clusters (e.g., free-flow and congested). The step 422 may include constructing a model using the clustering algorithm.

In some configurations, the clustering model used for step 422 may be expectation maximization for a Gaussian Mixture Model (GMM) with two means. This model may be implemented to provide a probability of whether a particular data point is within a given cluster.

Figure 8A:
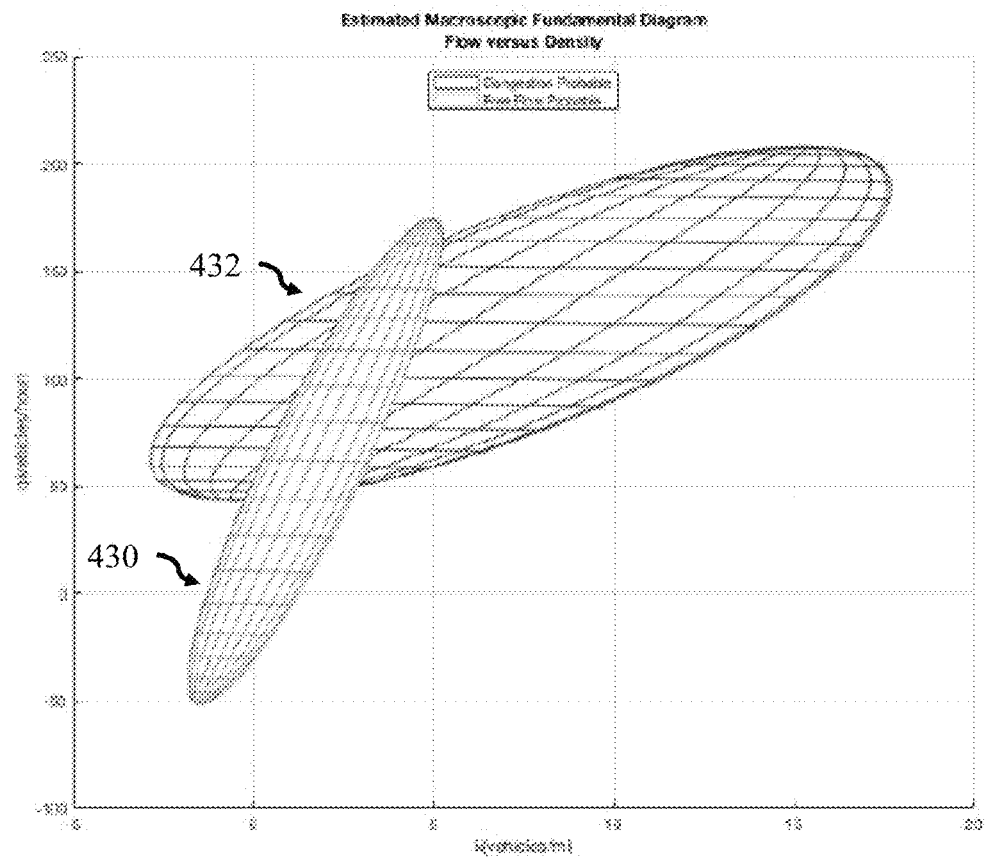
FIGS. 8A-8B illustrate the results of the clustering algorithm on the segment of roadway of FIG. 6.
Figure 8B:
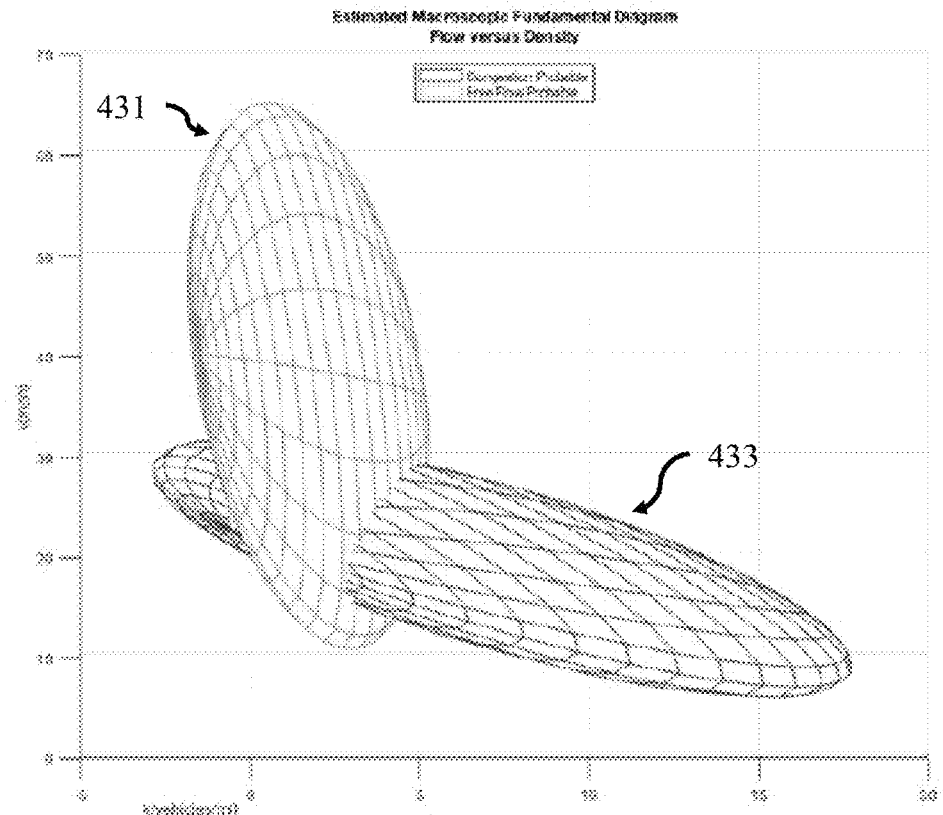

FIGS. 8A-8B illustrate the results of the clustering algorithm on the segment of roadway 302 of FIG. 6. In particular, FIG. 8A illustrates flow versus occupancy and FIG. 8B illustrates speed versus occupancy. Both FIGS. 8A-8B represent different perspectives of the same clustering result since data is clustered in three dimensions (speed, occupancy, and flow). In FIGS. 8A-8B, clusters 430 and 431 illustrate the subspace of flow, occupancy, and speed within two standard deviations from the free-flow cluster mean, and clusters 432 and 433 illustrate the subspace of flow, occupancy, and speed within two standard deviations from the congestion cluster mean. As illustrated, both subspaces encapsulate approximately 95% of the data is positioned within each cluster, indicating the relative distribution of data. Any data point that is characterized by flow, occupancy, and speed can determine a traffic state by considering the weighted distance from each cluster.

Once a model is constructed using the data, as described above, for the selected dateRange (e.g., three months), the method 400 may include classifying new data input to the model. For example, new data points may be input to the data set and classified into the two clusters (e.g., cluster 430 or 432, or cluster 431 or 433).

In some configurations, a low-pass filter may be implemented to counter noise in data, such as single data points. For example, a low-pass filter in the form of a five minute average of jam probabilities may be implemented. The five minute average of jam probabilities may be the probability that any data point is within the congestion cluster. The five minute average of jam probabilities may be calculated by summing the jam probabilities within a time-window and dividing the result by the length of the time-window. A threshold may be assigned to the algorithm to determine whether a segment is in a congested state or not. In some configurations, the threshold may be set to between 86% and 100% certainty.

Figure 9A:
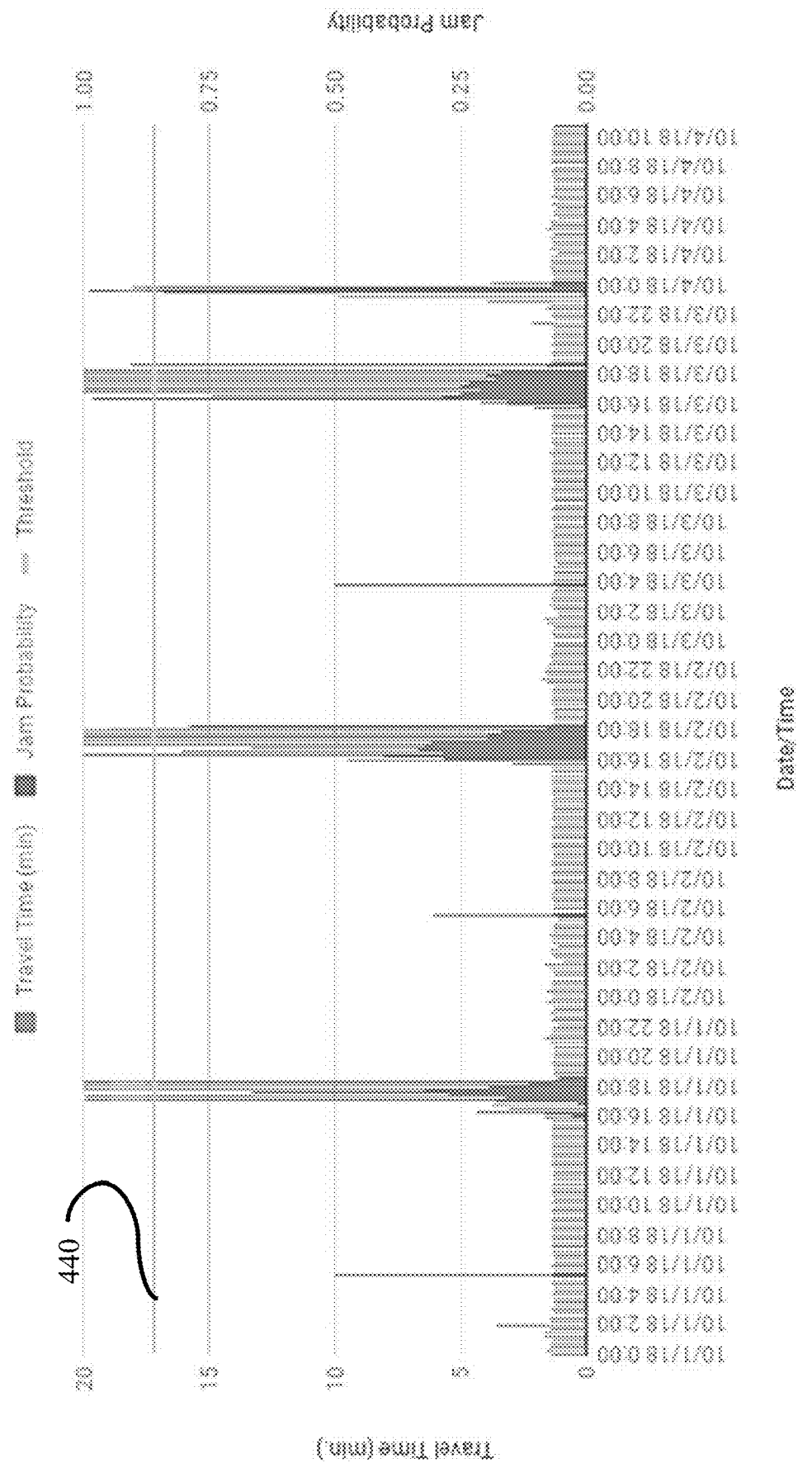
FIG. 9A illustrates results of the detection and alert algorithm applied over a period of a week.

FIG. 9A illustrates results of the detection and alert algorithm applied over a period of a week. In FIG. 9A, line 440 represents the threshold to determine whether a segment is in a congested state or not (e.g., at 86%), and the larger set of bars in the graph represent the probability of jam. The smaller set of bars in the graph represent the corresponding travel-time at each time.

Figure 9B:
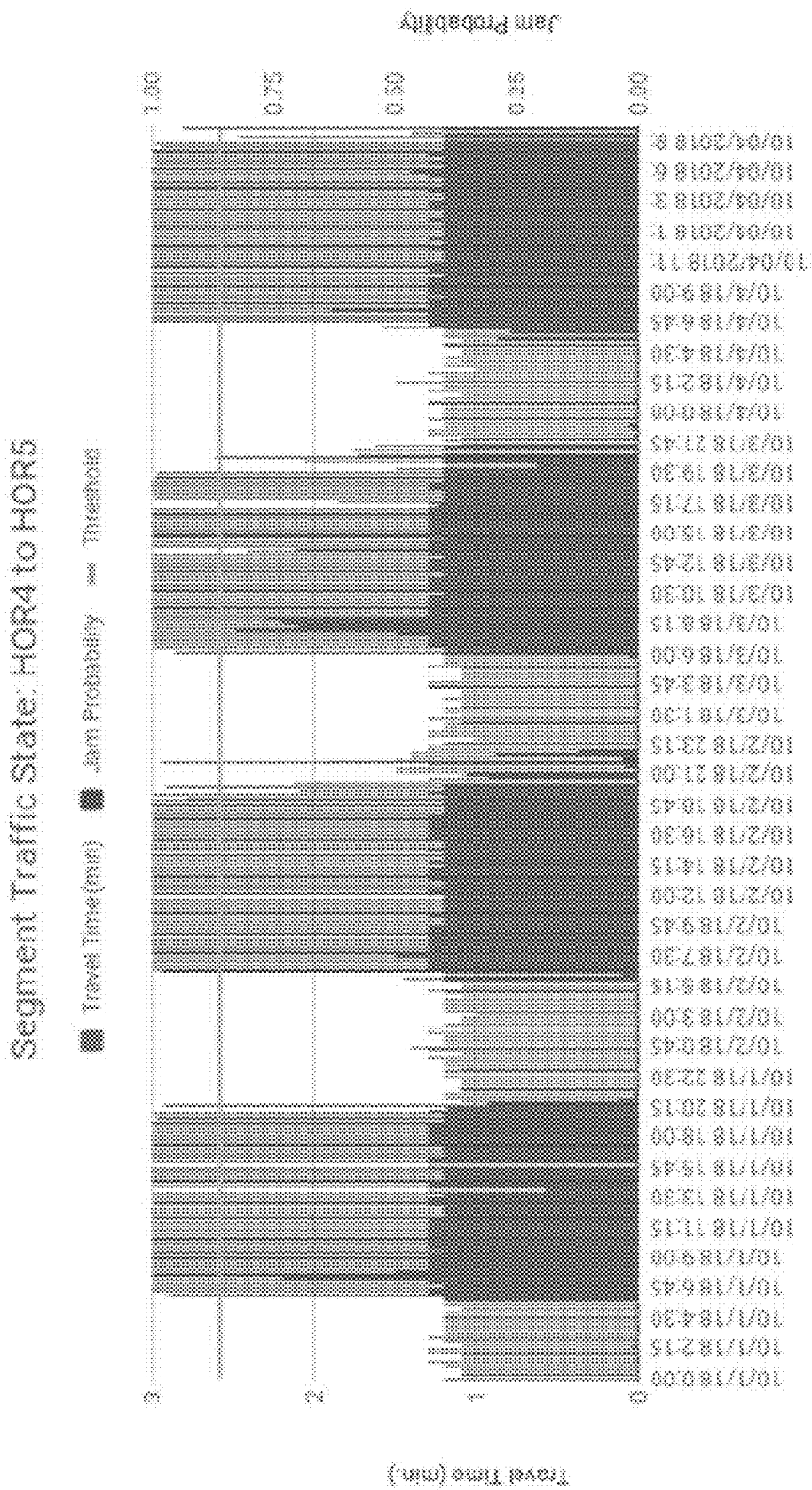
FIGS. 9B-9C illustrate results of the detection and alert algorithm applied to the reversed segment from FIG. 6.

FIG. 9B illustrates results of the detection and alert algorithm applied to the reversed segment from FIG. 6 (e.g., north bound from sensor 307 to sensor 305). As shown in FIG. 9B, in some circumstances, the model produced by the clustering algorithm may not correspond well to the travel times along that segment. In FIG. 9B, the clusters of free flow versus congested flow appear to be centered around day and night. In such circumstances, the expectation maximization algorithm, which begins with two random means, appears to have converged onto a local minimum. Accordingly, in some circumstances it may be desirable to select a suitable model that will accurately predict free flow or congested flow.

Figure 9C:
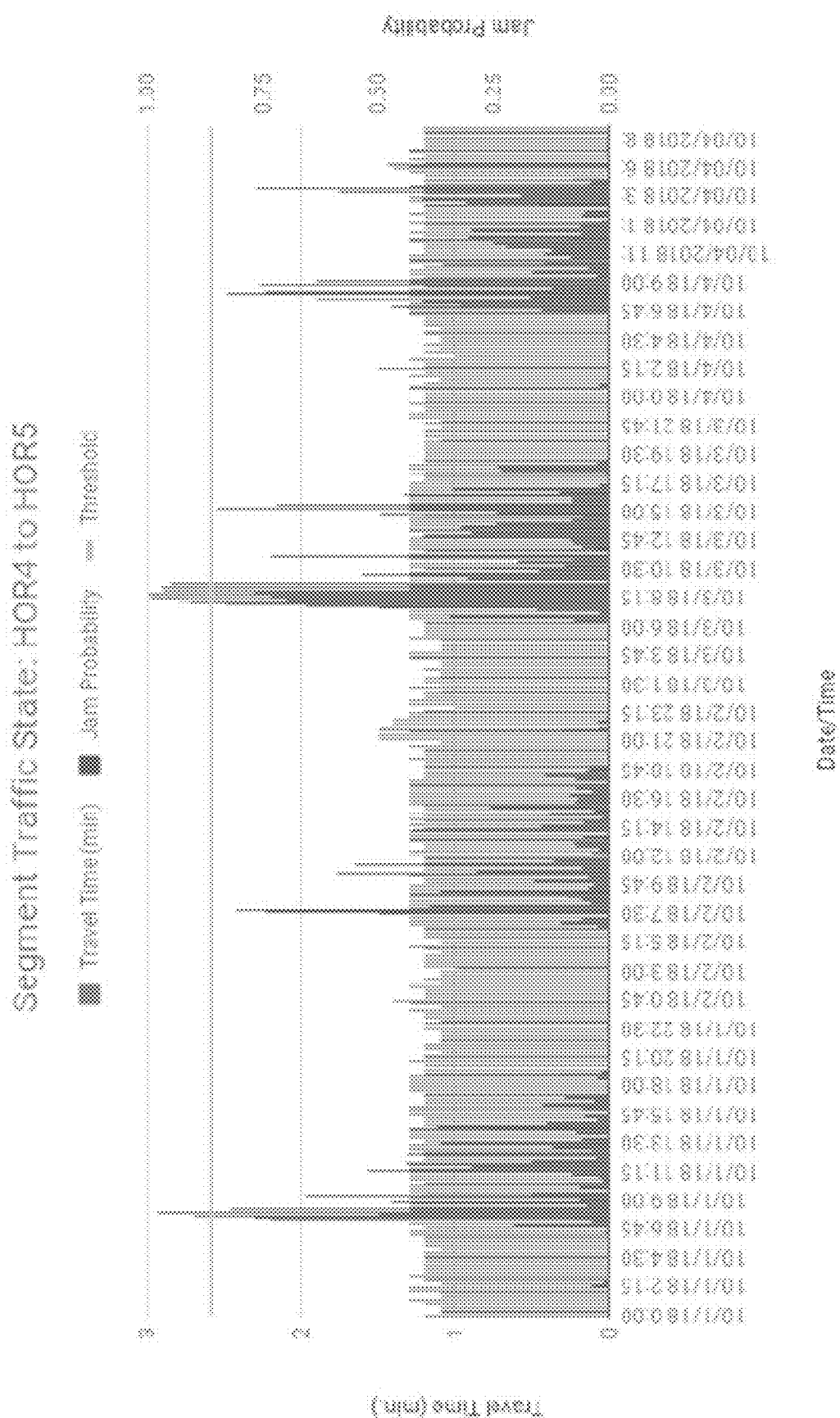

Accordingly, the method 400 may include selecting a suitable model to accurately predict free flow or congested flow. To assist in selecting a model, it may be assumed that the majority of data will be in either one cluster or the other (free flow or congested flow). For each model an entropy value may be calculated, which may be the sum of the weights the negative cluster weights times the log of the weight. In some configurations, the most biased model may be selected, or the model that minimizes the information entropy may be selected, so that each data point provides a large amount of information. The minimization of entropy may be performed by stochastic optimization, for example simulated annealing, or any other suitable method. Additionally or alternatively, to choose a model in such a manner, a non-linear optimization algorithm called the Covariance Matrix Adaptation may be implemented to minimize the cost function:

$$\text{cost} = \sum_{i=1}^{2} -\log(p_i)$$

Where $p_i$ represent the weights of the Gaussians in the resulting mixture model. After one-hundred iterations, wherein each iteration includes the clustering algorithm of FIG. 7. FIG. 9C illustrates the results of the model chosen based on the above-described method of selecting a suitable model to accurately predict free flow or congested flow. As shown in FIG. 9C, the jam probabilities in the selected model corresponds better with the actual travel times along the specific segment. Accordingly, some embodiments include configurations for automatic model selection by generating multiple models and selecting the best according to a desired metric, or by optimization methods that search for an optimal model. In one example, an optimization method called covariance matrix adaptation evolution strategy (CMA-ES) may be implemented. However, any suitable optimization may be implemented, as well as simply running the clustering algorithm multiple times and choosing the best model. Such configurations may ensure that well-behaved models are generated by the clustering algorithm.

Using Basic Safety Messages (BSM) to Determine Jam Probabilities

As described above, DSRC is a wireless communication technology that allows automobiles in connected vehicle systems to communicate with other automobiles or roadside equipment. DSRC technology can be used in either a vehicle-to-vehicle or vehicle-to-infrastructure format. Vehicle-to-vehicle communication may be implemented for safety reasons, such as to alert the driver of one car that the car in front of it is about to slow down. One type of communication that may be implemented in DSRC systems is Basic Safety Messages (BSM).

BSM may include core data such as vehicle size, vehicle type, vehicle description, position, speed, heading acceleration, brake system status, etc. In some circumstances, BSM with core data may be transmitted approximately ten times per second, although other configurations may be implemented. Additionally or alternatively, BSM may include event data such as activation of emergency braking, anti-lock braking systems, accidents, recent braking, path prediction, throttle position, vehicle mass, or other variable or event-based data elements. BSM with event data may be transmitted less frequently than BSM with core data. BSM may be transmitted over DSRC with a range of approximately 1000 meters.

In some configurations, BSM may be used to determine jam probabilities. For example, BSM may be implemented in the methods and configurations described above to track, model, and/or predict the flow of traffic through segments of roads or intersections. In such configurations, BSM may be used to obtain data regarding the position and/or travel of vehicles in a segment of roadway. Additionally or alternatively, BSMs, SPAT, and/or MAP messages can be used to determine the state of traffic. Basic Safety Messages (BSMs) transmitted by OBUs may be used to determine the flow or travel of connected vehicles in real-time, and future travel may be predicted based on the real-time data.

In one example, BSMs may be grouped by a windowed time, for example 5 mins, and a set interval of time may be taken, for example, in 5 min increments. An average speed may be calculated, for example, from re-identification data, probe data, radar data, directly from V2V or V2I communications or other speed information, as described above. Then, in each window of time and based on the number of BSMs received (BSMs can be received from multiple vehicles or from one vehicle) three metrics may be calculated: flow (Q) representing for example vehicles or data points per second, density or occupancy (K) representing for example vehicles or data points per mile, and speed (V). Q may be calculated by the count of BSMs times the window duration divided by 60 to generate a permit data rate. K may be calculated by Q divided by the mean speed. V may be calculated by Q divided by K. Together, these measures characterize the state of traffic and may be applied in the clustering method described above to robustly classify the state of traffic for each new data point in real-time.

In other configurations, Q may be obtained from volume data derived from, for example, a radar, magnetometer, conductive loop or other traffic counting devices. In yet other configurations, Q may be obtained from relative volume data from re-identification sensors, probe (e.g., GPS) or other data sets, which may provide either exact or relative volumes. The method could also be a hybrid comprising some BSM data, some re-identification data and volumes from either of those two and or volume from another traffic counting device.

For each window, the feature vector Q, K, V may be generated or calculated, and the features may be clustered. In some configurations, the features may be clustered using an unsupervised machine learning technique, with a machine learning technique, or with an expectation maximization and a Gaussian mixture model (e.g., with two clusters, as described above). In other configurations, the model may be a k-means mixture model or other clustering algorithm.

The cluster with the higher mean density K value may be determined, and this cluster may represent the data indicating a congested state. New data points may be classified based on the Gaussian model, or other, mixture model, which results in a probability that the data lies in either cluster. Then the probability that it lies in one cluster may be determined and that is the jam probability. Accordingly, the algorithm described above may be implemented using data from BSM's or connective vehicles rather than re-identification sensors.

In some embodiments, other variables may be added to the feature set Q, K, V. For example, predicted or current precipitation, wind speed, construction information, visibility, road quality data, paint line information, accident, traffic stops, events such as football games, traffic signal timing data, flight schedules, GPS data from vehicles or others may be added to the feature set described above.

For the processes and/or methods disclosed, the functions performed in the processes and methods may be implemented in differing order as may be indicated by context. Furthermore, the outlined steps and operations are only provided as examples, and some of the steps and operations may be optional, combined into fewer steps and operations, or expanded into additional steps and operations.

The embodiments described herein may include the use of a special purpose or general-purpose computer including various computer hardware or software modules.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

The terms and words used in this description and claims are not limited to the bibliographical meanings, but, are merely used to enable a clear and consistent understanding of the disclosure. It is to be understood that the singular forms "a," "an," and "the" include plural referents unless the context clearly dictates otherwise. Thus, for example, reference to "a component surface" includes reference to one or more of such surfaces.

Aspects of the present disclosure may be embodied in other forms without departing from its spirit or essential characteristics. The described aspects are to be considered in all respects illustrative and not restrictive. The claimed subject matter is indicated by the appended claims rather than by the foregoing description. All changes which come within the meaning and range of equivalency of the claims are to be embraced within their scope.

What is claimed is:

1. A method to prioritize and analyze data exchanged in a connected vehicle transit network, the method comprising:
 receiving, at a roadside unit, vehicle data from a connected vehicle;
 prioritizing the vehicle data received from the connected vehicle based on a level of urgency, network latency or available computing resources;
 wherein the prioritizing comprises determining whether the vehicle data is processed at the roadside unit or a server based at least in part on network latency;
 processing, at the roadside unit, the prioritized vehicle data;
 transmitting, by the roadside unit, a message including the processed vehicle data to a plurality of connected vehicles included in the connected vehicle transit network; and
 determining a respective behavior of each connected vehicle of the plurality based on the processed vehicle data included in the message.

2. The method of claim 1, wherein the message is transmitted to the plurality of connected vehicles in the area of the connected vehicle in response to determining that the vehicle data indicates the event is critical to safety, wherein the message notifies the other vehicles in the area of the event critical to safety.

3. The method of claim 1, further comprising transmitting a message to a localized server or a remote server in response to determining that the vehicle data indicates the event is not critical to safety.

4. The method of claim 1, further comprising:
 transmitting the vehicle data from the roadside unit to a server; and
 collecting, aggregating, and processing the vehicle data received from the roadside unit at the server.

5. The method of claim 1, further comprising adapting intersections to manage traffic in real-time based on the vehicle data received from the connected vehicle.

6. The method of claim 1, further comprising:
 receiving traffic signal phase and timing data, at the connected vehicle, from the roadside unit; and changing the behavior of the connected vehicle based on the traffic signal phase and timing data received from the roadside unit.

7. The method of claim 1, further comprising changing traffic signal phase and timing of at least one of the intersections.

8. The method of claim 1, wherein the vehicle data is exchanged between the connected vehicle and the roadside unit using dedicated short-range communication (DSRC), and the vehicle data comprises: speed, acceleration, engine performance, trajectory, intended destination, an indicator of an accident, or a combination thereof.

9. A method of actuating a traffic signal to improve traffic flow, the method comprising:
receiving a signal preemption request at roadside unit from a connected vehicle;
determining a priority of the signal preemption request, wherein the priority of the signal preemption request is determined based on a level of urgency associated with the signal preemption request according to real-time traffic data in the area of the traffic signal and a type of vehicle of the connected vehicle; and
determining whether to actuate the traffic signal immediately or after a specified amount of time has passed based on the priority of the signal preemption request, wherein the signal preemption request includes an identification of the type of vehicle of the connected vehicle and the priority of the signal preemption request is determined based on the type of vehicle of the connected vehicle associated with the signal preemption request.

10. The method of claim 9, wherein the priority of the signal preemption request is determined to be high based on the connected vehicle being an emergency vehicle.

11. The method of claim 10, wherein the traffic signal is actuated immediately in response to the determination that the priority of the signal preemption request is high.

12. The method of claim 9, wherein the priority of the signal preemption request is determined to be low based on the connected vehicle being a mass transit vehicle.

13. The method of claim 12, wherein the traffic signal is actuated after the specified amount of time has passed in response to the determination that the priority of the signal preemption request is low.

14. The method of claim 9, wherein the connected vehicle is a snow plow, and the actuation of the traffic signal depends on whether there is snow accumulation on a roadway associated with the snow plow.

15. The method of claim 9, wherein the connected vehicle is a mass transit vehicle, and the actuation of the traffic signal depends on a level that a mass transit vehicle is behind schedule.

16. The method of claim 9, wherein the traffic signal is actuated in response to low cross-traffic volume associated with the connected vehicle.

17. The method of claim 9, wherein the actuation of the traffic signal depends on whether the current time is within a peak traffic time range.

18. The method of claim 9, wherein the signal preemption request is exchanged between the connected vehicle and the roadside unit using dedicated short-range communication (DSRC).

* * * * *